United States Patent [19]

Doi et al.

[11] 3,944,292

[45] Mar. 16, 1976

[54] LOAD RESPONSIVE PRESSURE MODULATING VALVE DEVICE FOR USE IN A BRAKE SYSTEM OF A VEHICLE

[75] Inventors: Kaname Doi; Hiroaki Nagara, both of Itami, Japan

[73] Assignee: Sumitomo Electric Industries, Ltd., Osaka, Japan

[22] Filed: Aug. 13, 1973

[21] Appl. No.: 387,974

[30] Foreign Application Priority Data

Aug. 12, 1972 Japan.................. 47-80933

[52] U.S. Cl............... 303/24 C; 188/349; 303/6 C; 303/22 R
[51] Int. Cl.² ..... B60T 8/24; B60T 8/26; B60T 8/18
[58] Field of Search .......... 303/6 C, 22, 24 C, 24 F, 303/24; 188/195, 349

[56] References Cited
UNITED STATES PATENTS

| | | | |
|---|---|---|---|
| 3,317,251 | 5/1967 | Hambling et al................ | 303/6 C X |
| 3,377,108 | 4/1968 | Eddy................ | 303/6 C X |
| 3,383,139 | 5/1968 | Chevreux................ | 303/6 C X |
| 3,385,308 | 5/1968 | Farr.................... | 303/24 C |
| 3,403,946 | 10/1968 | Thirion................ | 303/6 C X |
| 3,476,443 | 11/1969 | Bratten et al................ | 303/24 C |
| 3,741,610 | 6/1973 | Holland.................. | 303/24 F X |
| 3,773,362 | 11/1973 | Lewis................ | 303/6 C |

Primary Examiner—Trygve M. Blix
Assistant Examiner—Douglas C. Butler
Attorney, Agent, or Firm—Sughrue, Rothwell, Mion, Zinn & Macpeak

[57] ABSTRACT

A load responsive pressure modulating valve device for use in a brake system of a vehicle is so constructed that the starting pressure for the pressure modulating operation is controlled by a specific valve operated by a partial pressure of the input hydraulic brake pressure. The device is capable of distributing the hydraulic brake pressure corresponding to a transient weight transfer from rear wheels of the vehicle to front ones caused by the braking operation, to the front and rear brakes by varying the starting pressure in response to load and deceleration of the vehicle.

10 Claims, 9 Drawing Figures

FIG.3
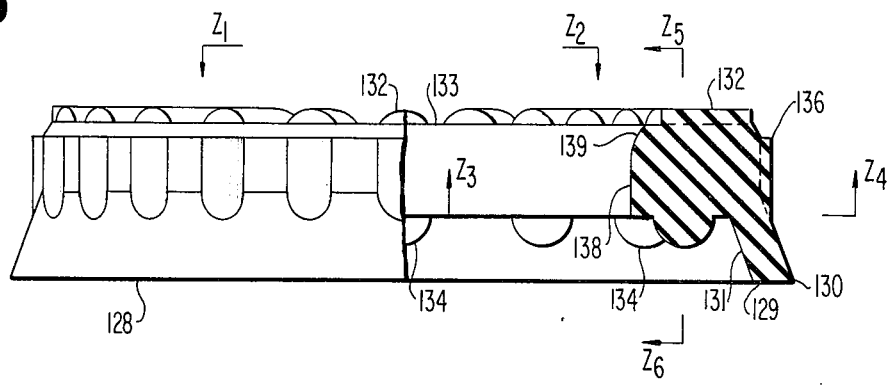
FIG.4
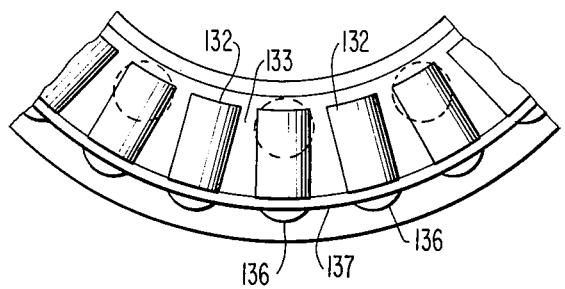
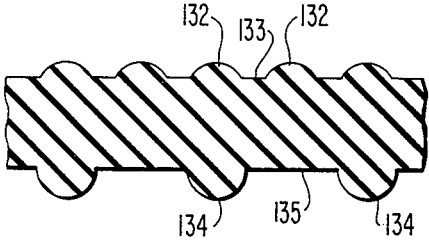
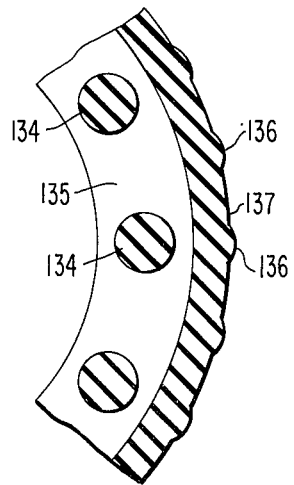
FIG.6
FIG.5

LOAD RESPONSIVE PRESSURE MODULATING VALVE DEVICE FOR USE IN A BRAKE SYSTEM OF A VEHICLE

BACKGROUND OF THE INVENTION

1. Field of the Invention

This invention relates to a type of pressure modulating valve device for use in a brake system of a wheel type vehicle, and more particularly to a load responsive pressure modulating valve device which is so constructed that a starting pressure for the pressure modulating operation thereof of which an input hydraulic brake pressure is changed to an output hydraulic brake pressure in a predetermined ratio, is controlled by a means of a specific valve operated by a partial pressure of the input hydraulic brake pressure when the input hydraulic brake pressure reaches a pre-set value. The device is capable of distributing the hydraulic brake pressure corresponding to a transient weight transfer from rear wheels of the vehicle to front ones caused by the braking operation to front and rear braking means by varying the starting pressure in response to load and deceleration of the vehicle.

2. Description of the Prior Art

In a wheel type vehicle, such as an automobile having wheels disposed at the front and the rear portions separately from each other and having independent braking means operated by a braking device for the front and rear wheels, respectively, it is a common practice that the the braking device is so constructed as to distribute the hydraulic brake pressure generated from a master cylinder thereof to the front and the rear braking means, respectively. In such a vehicle, it has already been found that the load on the front wheels increases, while the load on the rear wheels decreases owing to an inertia force proportional to deceleration of the vehicle upon applying the braking operation in comparison with that in a normal driving state. As a result of this, the braking effect of the front wheels increases, while that of the rear wheels decreases. Therefore, in case of applying the hydraulic brake pressure generated from the master cylinder to the front and rear braking means, it is preferable to equalize a substantial brake effect on the front wheels with that on the rear wheels by increasing the hydraulic brake pressure of the front braking means as compared with that of the rear braking means. For the purpose of accomplishing the above described effect, the hydraulic brake pressure generated from the master cylinder is supplied to the rear braking means directly, while an increased pressure is supplied to the front braking means or the pressure is supplied to the front braking means directly and at the same time a proportionally reduced pressure is supplied to the rear braking means. Brake systems utilizing a proportional pressure reducing valve enabling an effective pressure differential between front and rear wheels have been adapted for use in passenger car vehicles having a relatively low centre of gravity and small load variations. In vehicles having a higher centre of gravity and large load variation, however, it is necessary to consider the weight transfer caused by the load variation, so that it is preferable to vary the starting value of the pressure modulating operation in response to a load which has been detected automatically.

Several attempts have been proposed for accomplishing the above described necessity, all of them are so constructed that a starting value of a proportional pressure reduction valve means is controlled by a balance condition between an operational load of a control spring biasing a movable valve and an input hydraulic brake pressure being applied to the movable valve.

Briefly speaking known systems can be classified into the following three types:

a. According to the first type, change of a distance between a rear wheel axle and a chassis owing to load variation is detected by a linkage inclusive of a spring member.

b. the second type is to convert the above change of distance caused by the variation of vehicle load into a pressure change of a hydraulic brake pressure mechanism. For example, a change in hydraulic pressure of a shock absorber for rear wheels is utilized for the detection of load variation on rear wheels, and c. the third type has a pressure reducing valve with a valve means having a deceleration detecting means which is to be operated by a predetermined deceleration. In this type, a part of an input hydraulic brake pressure generated from the master cylinder is supplied to the rear braking means through the pressure reducing valve and, at the same time, another part of the input hydraulic brake pressure is supplied to the deceleration detecting means and further fed to a control chamber having a check valve and a spring housing in which a control spring is mounted. Then, the pressurized fluid is enclosed in the control chamber by dint of the check valve and the deceleration detecting means and the position of the spring housing in the control chamber is controlled by the enclosed hydraulic brake pressure. In accordance with the above described construction, a sealingly enclosed hydraulic brake pressure in the control chamber becomes higher along with an increase in vehicle load, and thus an increase in an operational load of the control spring owing to an increase of a displacement of the spring housing shifts the starting point for the pressure modulating operation of the pressure reducing valve toward high pressure zone.

In known pressure reducing valves as set forth above, despite the requirement of high precision for a set load of a control spring, there are many different spaces between a rear wheel axle and a chassis even in same type vehicle, so that dimensional errors upon assembling a linkage together with a proportioning pressure reducing valve tend to take place. Thus, an apparatus according to the first type is difficult in assembling and adjustment and the linkage is subjected the lowering of function owing to icing in winter.

An apparatus according to the second type is complex in its structure and is difficult to mount on the vehicle. Furthermore the apparatus is excessively sensitive to irregular road surface conditions.

In apparatus according to the third type, as the hysteresis at the outlet side generated in a normal brake releasing process becomes large in proportion to an increase in spring constant of the control spring, and the larger the load capacity of the wheels, the larger the difference between respective hydraulic brake pressures at the starting point for the pressure reducing operation at light and heavy loads becomes. Therefore, if such a pressure reducing valve having less hysteresis is used, a larger allowance of displacement for a spring housing is required so that the volume of circuits is unnecessarily.

SUMMARY OF THE INVENTION

Accordingly to a load responsive pressure modulating valve device of this invention, the above described drawbacks of the prior art are completely eliminated.

A primary object of this invention is to provide a load responsive pressure modulating valve device which controls a starting pressure of the hydraulic brake pressure modulating valve in proportion to the load on the vehicle by closing a check valve and sealing a hydraulic brake pressure in a control chamber in response to a predetermined deceleration which has been detected by means of a deceleration detecting means.

Another object of this invention is to provide a load responsive pressure modulating valve device minimizing a hysteresis, i.e., a gap between a hydraulic brake pressure increasing curve along a pressure increasing process upon the braking operation, and a decreasing curve along a pressure decreasing process upon discharging the hydraulic brake pressure.

A further object of this invention is to provide a load responsive pressure modulating valve device which suppresses the rise of pressure in the control chamber without preventing shifts of the plungers, and operates effectively along a pressure decreasing process upon discharging the hydraulic brake pressure.

A further object of this invention is to provide a load responsive pressure modulating valve device which has proportional pressure reduction characteristics which match a pressure reduction ratio through any loading condition.

Another object of this invention is to provide a load responsive pressure modulating valve device which prevents the pressure in the control chamber from becoming higher, in comparison with the input hydraulic brake pressure, when the braking fluid is sealed in the control chamber by means of a check valve.

A further object of this invention is to provide a load responsive pressure modulating valve device which is able to control the hydraulic brake pressure throughout the load variation range by utilizing a factor which has a small variation range, such as a variation of deceleration, owing to a change of load condition.

BRIEF EXPLANATION OF THE DRAWINGS

The above and other objects, features and advantages of this invention will become apparent in detail from the following description taken in conjunction with the accompanying drawings in which;

FIG. 3 is an enlarged view showing the partial section of the seal valve adapted for the proportioning valve apparatus in FIG. 2;

FIG. 4 is a partial view of the seal valve as seen from $Z_1 - Z_2$ direction in FIG. 3;

FIG. 5 is a partial sectional view of the seal valve as seen from $Z_3 - Z_4$ in FIG. 3;

FIG. 6 is a partial sectional view of the seal valve as seen from $Z_5 - Z_6$ in FIG. 3;

DETAILED DESCRIPTION OF THE PREFERRED EMBODIMENT

Figure 1:
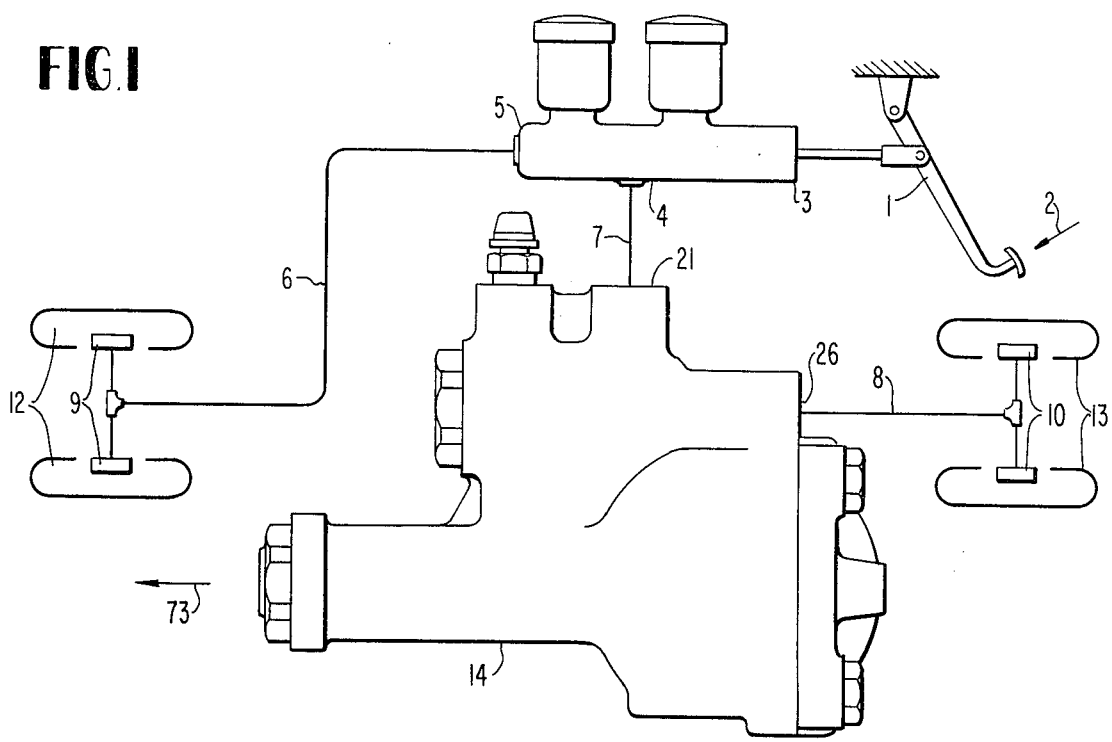
FIG. 1 is a schematic diagram of a vehicle braking system utilizing a load responsive, pressure modulating valve device according to the present invention.

The diagram, shown in FIG. 1, shows a load responsive proportioning pressure reducing valve 14 of the present invention applied to a typical front and rear wheel separate type brake hydraulic circuit having a normal tandem master cylinder operable by the application of the brake pedal 1 with a pedal effort 2. The secondary chamber 5 of the tandem master cylinder 3 is connected, through the front wheel conduit 6, to the front wheel brakes 9. The primary chamber 4 of the tandem master cylinder 3 is connected to the inlet port 21 of the load responsive proportioning valve 14 by a first rear wheel conduit 7 and the output port 26 is connected to the rear wheel braking means 10 via second conduit 8.

The load responsive proportioning pressure reducing valve 14 shown in FIG. 2 has a valve body 20 and end 40 to form a casing, and a first O-ring 72 made from high polymer resilient material properly compressed between the contact face 41 of the first annular shoulder 54 and the end cover 40 formed by the sensor housing 53 as will be hereinafter described is provided in the O-ring housing 52 provided in end face 51 of the valve body 20. Thus, the valve body 20 and the end covers 40 are sealingly joined by the bolts 47.

In the casing of valve 14 are contained a proportioning valve apparatus 80, to proportionally reduce the pressure introduced into inlet 21 through the first rear wheel conduit 7 to discharge it to the second rear wheel conduit 8, a deceleration sensing mechanism 50 for sensing the deceleration generated by the brake application, and a control apparatus 150 for controlling the starting point of the operation of the proportioning valve apparatus 80 in response to the operation of the deceleration sensing mechanism 50 and at the same time for controlling the set value of the deceleration sensing mechanism 50. One chamber of the proportioning valve apparatus 80 is connected to the deceleration sensing mechanism 50 by passage 27, while the other chamber of the proportioning valve apparatus 80 is connected to the control a 150 by the fluid passage 28 and fluid passage 103. The deceleration sensing mechanism 50 is connected to the control apparatus 150 by the fluid passage 67 and fluid passage 68 through the check valve 69.

The deceleration sensing mechanism 50 includes a deceleration sensor 59, which slides or rolls in either the forward or backward direction of the vehicle in response to the deceleration value of the vehicle produced by a brake application and the check valve mechanism 60 to 71 for closing the fluid passage when the displacing amount of the deceleration sensor 59 exceeds a predetermined value. The deceleration sensor 59 is confined in the sensor housing portion 53 of valve body 20 provided with the sensing chamber 75 formed by the travelling clearance 56 so as to slide or roll only in the direction of the arrow 73 or 74. The control apparatus 150 and the deceleration sensing mechanism 50 are disposed on the common axis $X_1 - X_2$. On the axis $X_1 - X_2$ of the sensing chamber 75 adjacent to the control apparatus 150, are provided a check valve chamber 57 comprising part of the check valve mechanism and annular shoulder 58 formed by the stepped bore 157 passing from the sensing chamber 75 to the control apparatus 150 to form catching portion of the check valve 69.

Fluid passages 55 are provided parallel to the axis $X_1 - X_2$ in the sensing chamber 75 in order to make smoothly movable the deceleration sensor 59 by the inertia force produced as a result of the deceleration and not to urge back the deceleration sensor 59 in the direction of the arrow 74 when pressure fluid flows abruptly in the sensing chamber 75 through fluid passage 27 and to prevent occurring the local hydraulic pressure difference in the sensing chamber 75 by the movement of the deceleration sensor 59. The ratio of the effective area of a fluid passage communicating with the front part and the rear part chambers of the sensing chamber 75 separated by the deceleration sensor 59 in the direction of the axis $X_1 - X_2$ is held over 28%. The check valve plunger 60 operates upon receipt of the inertia force of the deceleration sensor 59 when the hydraulic brake pressure is increased in the normal speed, while it so operates to promote the inertial force action of the deceleration sensor 59 upon receipt of the hydraulic pressure when the hydraulic brake pressure is increased in quick speed, thereby making it possible to effectively operate the check valve 69 of high polymer resilient material in order to close the fluid passage between the deceleration sensing mechanism 50 and the control apparatus 150.

The check valve plunger 60 has a head face 61 with a flat shape contacting the deceleration sensor 59 for quickly operating upon abrupt pressure application and for catching the operation of the deceleration sensor 59, an annular shoulder 62 for backing up the check valve 69 for exerting an effective sealing function of the contact portion 70 when the check valve 69 is pressed onto the annular shoulder 58, the valve retaining groove 63 for properly engaging the check valve 69, and the plunger stem 64 slidably engaging an extreme small gap against the stepped bore 157 perpendicularly crossing with the annular shoulder 58 for effectively performing the above function upon quick pressure application for connecting to the annular shoulder 58 simultaneously with all the circumference of the contact portion 70 of the check valve 69, etc.

The plunger stem 64 has a spring holding bore 65 for holding the sensor control spring 199 as described hereinafter, the fluid passage 68 with an opening at the side of its end surface, the annular shoulder 66 for receiving one end of the sensor control spring 199, and the fluid passage 67 crossing perpendicularly to the head of the plunger stem 64 to communicate with the fluid passage 68.

The check valve 69 for effectively closing the fluid passages 67 and 68 between the sensing chamber 75 and the control apparatus 150 by responding to the movement of the deceleration sensor 59 in the direction of the arrow 73, has a flange extended radially inner-wards tightly engaged with the valve retaining groove 63, the contact portion 70 being contactable with annular shoulder 58 to perform the sealing function, and a groove for receiving the valve retainer 71 formed in C-shape for engaging the flange more tightly with the valve holding groove 63.

In order to prevent the shock noise generated upon its arrival at the inside boss 42 of the end cover 40 when the deceleration sensor 59 is pushed back in the direction of the arrow 74 from the state of the closing position of the check valve 69, a damper 45 made of high polymer resilient material is incorporated in blind bore 43.

The control apparatus 150 is provided coaxially to the axis $X_1 - X_2$ of the deceleration sensing mechanism 50 and oppositely to the opening end face 51 of the valve body 20, and has a stepped bore 151, internal threads 152, stepped bore 153, stepped bore 154, stepped bore 155, bore 156 and stepped bore 157 communicated with the sensing chamber 75, each stepped bore being diminished in diameter from the preceding bore. The end 158 of the control apparatus 150 is closed by end plug 162 having the extension 164 tightly engaged with stepped bore 151, external threads 165 screwed in the internal threads 152, the stepped extension 166 movably engaged with stepped bore 153, and the hexagonal plug head 163 provided for the purpose of easily screwing in the asembly. When annular shoulder 167 formed by the plug head 163 and the extension 164 are screwed in, the annular shoulder 168 formed by the stepped extension 164 and the external threads 165, the annular shoulder 159 formed by the stepped bore 151 and the internal threads 152, and the O-ring 185 of high polymer resilient material interposed in the cavity formed by the stepped bore 151 and the external threads 165 are so disposed as to be constrict by the annular shoulders 159 and 168 and thereby seal completely the opening of the second opening end 158.

At the central portion of the free end 169 of the end plug 162 there is provided fluid passage 172 having an opening at the free end 169 side, and fluid passage 173 communicating therewith and passing through the small stepped extension 166. The fluid passage 172 and the fluid passage 173 cooperate with the gap established between the stepped bore 153 and the small stepped extension 166 for transmitting the hydraulic pressure without delay to the cup seal 186 as hereinafter described when the projection 180 is engaged with the annular shoulder 171 formed by the cavity 170 and the fluid passage 172.

When the pressure in the interior of the control apparatus 150 increases over a specific value, the differential piston 175 displaces in the direction of the arrow 74 in proportion to the value of the hydraulic pressure for the reason hereinafter described, and accordingly the end portion of the projection 180 is held to the position separated from the annular shoulder 171. The cup seal 186 move toward the end of the projection 180 due to the negative pressure produced temporarily when the internal pressure is abruptly released from such a state and at the same time the end surface of the projection 180 contacts the annular shoulder 171. The annular land formed by the free end 169 is provided so as to limit the movement of the cup seal 186 and to return the cup seal 186 to the original position. Therefore, a sufficient length is given to the projection 180 so that the cup seal 186 may not be a part therefrom.

The differential piston 175 has a large diameter piston 176 slidably engaging the stepped bore 153 in flange shape, and a small diameter piston 177 slidably engaging the stepped bore 154 in the same manner, a projection 180 projected in the direction of the arrow 73 from the large diameter piston 176, the projection 182 projected in a direction of the arrow 74 from the small diameter piston 177, and a fluid passage 184 passing through the reduced diameter portion 178 which is smaller in diameter than the others.

In the cavity formed by annular shoulder 181, large diameter piston 176, projection 180, and the stepped bore 153, and in the cavity formed by the annular shoulder 183, small diameter piston 177, projection 182, and the stepped bore 154, are inserted the cup seal 186 and 187 formed of high polymer resilient material with lip flanges sealingly engaging the outer peripheral wall of the respective projection and the inner peripheral wall of the respective stepped bores.

At the differential piston 175 there is provided an annular space formed by the large diameter piston 176, the small diameter piston 177, the reduced diameter portion 178, the stepped bore 153 and the stepped bore 154 which forms an air chamber 170 completely sealed by the cup seals 186 and 187 for the purpose as will be hereinafter described.

Spring retainer 188 has at one side the projection housing 189 formed by a diameter engageable with the projection 182 for the purpose of centering on the differential piston 175 and at the other side the large retaining bore 193 for retaining at the center the adjusting spring 198 in cooperation with the stepped bore 156, the small retaining bore 191 for retaining the sensor control spring 199 at the center of its in cooperation with the spring retaining bore 65, and the outer diameter forming a proper gap provided between the fluid passage 195 and the stepped bore 154 so as to allow the transmission of the hydraulic pressure to the cup seal 187.

The free end 196, formed at one side of the spring retainer 188, holds the cup seal 187 in an extremely small gap to prevent it from dropping from the second projection 182. The free end 197 formed at the other side of the spring retainer 188 limits movement of the differential piston 175 in the direction of the arrow 74 by engaging the annular shoulder 160 formed by the stepped bore 154 and the stopped bore 155 for the purpose as will be hereinafter described.

The one end of the adjusting spring 198 is retained by the annular shoulder 194 formed by the large retaining bore 193 and the small retaining bore 191, and the other end thereof is supported by the annular shoulder 161 formed by the stepped bore 156 and stepped bore 157 so that its expansion force urges the differential piston 175 in the direction of arrow 73. Further, one end of the sensor control spring 199 is supported by the annular shoulder 192 formed by the small retaining bore 191 and the fluid passage 195, and the other end thereof is supported by the annular shoulder 66 formed by the spring retaining bore 65 and the fluid passage 68 so that its repulsion force urges the deceleration senser 59 in the direction of the arrow 74 through the check valve plunger 60 and the differential piston 175 in the direction of the arrow 73.

The proportioning valve apparatus 80 disposed on the axis $Y_1 - Y_2$ and has a housing having open end 86 situated to the opposite side of the opening end surface 51 of the valve body 20, stepped bore 81, the first internal screw 82, the stepped bore 83, the stepped bore 84 and stepped bore 85 wherein each of the diameters of the stepped bores are smaller than the preceding bore.

The opening of the open end 86 side of the proportioning valve apparatus 80 is closed by the end plug 91 composed of the large stepped extension 93 tightly engageable with the stepped bore 81, the external screw 94 screwed with the internal screw threads 82, the small stepped extension 95 tightly engageable with the stepped bore 83, and hexagonal plug head 92.

The O-ring 104 of the normal type formed by high polymer resilient material is inserted into the cavity formed by the annular shoulder 97, the annular shoulder 87, the steped bore 81, and the opening of the first opening end 86.

The cup seal 106 of normal type formed by high polymer resilient material having an outer lip flange sealingly engaging the inner wall surface of the seal housing 100 and an inner lip sealingly engaging the outer wall surface of the lower stem 121 for shutting the hydraulic pressure between the stepped bore 84 and the blind bore 101, excepting special cases as will be hereinafter described is provided in the seal housing 100. O-ring groove 99 is provided at the small stepped extension 95, and is fitted with the O-ring 105 of normal type formed of high polymer resilient material. The external screw portion 94 has a plurality of radial fluid passages 103 at positions corresponding substantially to the fluid passage 28, communicating with the fluid passage 125 and the blind bore 101 passing through the axis of the external screw portion 82 and the fluid passage 125 of annular groove type. The main purpose of these fluid passages 103 and 125 are for always communicating the chamber formed by the blind bore 101 through the fluid passage 28 with the control apparatus 150. Therefore, the sealing action between the sensing chamber 75 and the control apparatus 150 by the connection of the contact portion 70 with annular shoulder 58 and the sealing actions of the cup seal 106 and the O-ring 105 cooperate to hydraulically isolate the chamber defined by the blind bore 101 from the chamber formed by the stepped bore 84. At the same time the hydraulic pressure in the control apparatus 150 and the blind bore 101 are kept always on the same level.

Between the stepped bore 83, the stepped bore 84, and the free end 98 of plug 91, there, is inserted a limiter ring 108 composed of a thickness having a slight gap in axial direction thereto, an outer diameter movably engaged with the stepped bore 83, and an inner diameter larger than the lower stem 121. The limiter ring 108 functions to prevent the cup seal 106 from slipping of the first seal housing 100 by the negative pressure appearing when the hydraulic pressure in the chamber formed by the stepped bore 84 is abruptly reduced, and at the same time prevents the plunger valve 109 from moving in the direction of the arrow 126 more than required for the purpose as will be hereinafter descrlbed. The plunger valve 109 is smoothly slidable in the stepped bore 84 and is locally formed with a circle at the top of regular polygonal shape in order to have proper fluid passage, and has two flanges apart each other with proper distance, that is, the upper sliding flange 118 and the lower sliding flange 119, the reduced diameter portion 120 having a diameter smaller than a segment of the regular polygonal shape interleaved between both flanges, lower stem 121 having a diameter, for slidably engaging with the blind bore 101 extended toward the axis at one side of the lower sliding flange 119, cylindrical valve head 110 provided to a proper valve head gap 111 between the stepped bore 85 and extended toward the axis at the other side of the upper sliding flange 118, neck portion 116 formed with a diameter smaller than any of the two interleaved between the upper sliding flange 118 and the valve head 110, seal retaining portion 117 expanded in radial direction for holding the seal valve 128, and lower projection 123 of small diameter further extended in an axial direction from one side of the lower stem 121. The diameter of the lower projection 123 is so determined as to be slidably engaged with respect to the inner diameter thereof for holding at the center the plunger actuating spring 107. The flange end 122 formed by the lower sliding flange 119 and the lower stem 121 is so determined in dimension for the purpose of controlling the proper value of the moving amount as to enable it to be contacted in support onto the end surface of the limiter ring 108 when the plunger valve 109 moves in the direction of the arrow 126. The rounded portion 112 for performing the proportioning pressure reducing function in cooperation with the seal valve 128 as will be hereinafter described is provided at the portion of the valve head 110 adjacent to the neck portion 116. At the center portion of the valve head 110 are provided fluid passage 114 substantially coinciding with the fluid passage having an opening at the valve head end 113 and a number of radial fluid passages 115 crossing therewith.

In the interior of the blind bore 101 there is disposed the annular shoulder 124 formed by the lower stem 121 and the lower projection 123, and the plunger actuating spring 107 which is held at the end of the blind bore bottom 102 forming the bottom of the blind bore 101. The expansion force of the plunger actuating spring 107 urges the plunger valve 109 so as to contact the valve head end 113 to the annular shoulder 90.

In the cavity formed by the annular shoulder 89, the seal retaining portion 117, the neck portion 116 and the stepped bore 84 is disposed the seal valve 128 for performing the main function of the present proportioning valve apparatus 80 in cooperation with the plunger valve 109 when the valve head end 113 is engaged with annular shoulder 90.

The seal valve 128 cited in the present invention is the same as U.S. Pat. No. 3,423,936, but in order to clarify the function in relation to the present invention, its structure and function will now be described in detail.

The seal valve 128 formed of high polymer resilient material is made up of the portions having the following purposes as will be hereinafter described.

In FIGS. 2 to 6, in the state that the seal valve 128 is not restricted, it has the sealing flange 129 containing the lip portion 130 bent downwardly and extending toward the outer circumferential direction. When the seal valve 128 is involved in the cavity and the lip portion 130 is contacting the wall surface of the stepped bore 84, the dimension of the sealing flange 129 is determined so as to deform slightly inwardly. This deforming effect prevents the fluid from passing between the inlet port 21 and the outlet port 26 outside the lip portion 130 excepting the special conditions as will be hereinafter described. At the upper portion of the seal flange 129 is disposed a plurality of axially extending ribs 136 generally in semicylindrical shape spaced equidistantly about the periphery. The size of the outside of the axially extending ribs 136 are so provided as to contact the wall surface of the stepped bore 84 when the seal valve 128 is inserted into the cavity. On the lower surface of the seal valve 128 there are disposed a number of semispherical bosses 134 projecting downwardly therefrom and equi-distantly spaced about the periphery. These semispherical bosses 134 become the post for pushing the seal valve 128 by the seal retaining portion 117. The boss clearance 135 formed by contacting the seal retaining portion 117 with the semispherical boss 134 forms the fluid passage connected to the fluid passage formed by the inside portion of the flange 131 and the outside cylindrical post of the seal retaining portion 117 to become the fluid passage for communicating the brake fluid of the inlet port 21 with the outlet port 26. At the upper end of the seal valve 128 are disposed a number of cylindrical radial ribs 132 substantially equi-distantly spaced for contacting the annular shoulder 89. The relative position of the radial ribs, 132 and the axially extending ribs 136 are positioned in the same row and the same distance so as to form fluid passages by the radial grooves 133 and axial grooves 137. This provision functions to keep the hydraulic pressure of the outlet port 26 at the outside upper portion of the lip portion 130 always when the rounded portion 112 is pushed against the valve seat 139 so that the value of the hydraulic pressure of the outlet port 26 side is able to arrive at slightly higher level in comparison with the value of the hydraulic pressure of the inlet port 21 side. Also this provision functions to make the value of the hydraulic pressure on the outlet bore 26 side and that on the inlet port 21 side approximately equivalent to each other by passing the fluid of the outlet port 26 side through the outside of the lip portion 130 to counterflow to the inlet port 21 side when the hydraulic pressure force thereby exceeds the force produced by the internal deformation of the sealing flange 129, the sealing flange 129 further receives slight deformation therein and the lip portion 130 apart from the wall surface of the third stepped bore 84. At the upper end of the inner peripheral surface 138 of the seal valve 128 is provided a valve seat 139 formed on the curve surface at its corner. This curved surface of the valve seal 139 is so provided as to move in the direction of the arrow 126 due to the balance condition of hydraulic pressure acting upon the plunger valve 109 and to receive the plunger valve 109 therein when the rounded portion 133 contacts the valve seat 139, and to perform the sealing function together with urging the slight change of shape of the contacting portion.

The dimension of the diameter of the inner peripheral surface 138 of the seal valve 128 is so determined as to satisfy the following items:

One item is to constitute the element of the fluid passage adapted for forming an annular fluid passage by setting the inner diameter of the inner peripheral surface 138 larger than the outer diameter of the neck portion 116 and for transmitting the brake fluid of the inlet port 21 side to the outlet port 26 side as the fluid passage linked to the boss gap 135.

Another item is that when the rounded portion 112 contacts the valve seat 139, the latter supports the former to become a support for the valve seat 139 in order to continuously hold the positive sealing function.

It will be hereinafter described as to the relation between the operational principle of the apparatus of this invention and the operational principle of the proportioning valve apparatus 80, but when the hydraulic pressure of the inlet port 21 side arrives at the predetermined value, it is urged toward the arrow 126 by the hydraulic pressure acting onto the plunger valve 109 to be a balanced state where the rounded portion 112 connects the valve seat 139. When the pressure of the inlet opening 21 side increases a little further, the above balanced condition is broken so that the contact is released. The contact is reestablished when a certain rate of the slightly increased hydraulic pressure of the inlet port 21 side is transmitted to the outlet port 26 side after this release of the contact. The operational function of the proportioning valve apparatus 80 in the process of brake pressure application is thus conducted every time the hydraulic pressure of the inlet port 21 side slightly increases, so that the opening and closing operation between the valve seat 139 and the rounded portion 112 is repeated, and the pressure increase of the outlet port 26 side is reduced with the predetermined rate in comparison with the increase of the hydraulic pressure of the inlet port 21 side. Therefore, when the increase of the hydraulic pressure of the inlet port 21 side is stopped at the proportioning pressure reducing state where the opening and closing are repeated so that its hydraulic pressure is kept the same, the rounded portion 112 holds the connected state with the valve seat 139. The pressure of the inlet port 21 side is held in high level in comparison with the pressure of the outlet port 26 side at the proportioning pressure reducing state for the reason as was described above. The seal valve 128 at the proportioning pressure reducing state is pushed onto the annular shoulder 89 by the hydraulic pressure force.

Further item of the value of the diameter of the inner peripheral surface 138 is that special function is so determined to perform when the pedal effort 2 is slacked from the time point when it is operated in the above described proportioning pressure reducing state so that the hydraulic pressure of the inlet port 21 side is reduced. The acting force against the plunger valve 109 at the proportioning pressure reducing state is balanced at the state where the value of the pressure of the outlet port 26 side is a low level compared to the value of the hydraulic pressure of the inlet opening 21 side, so that the rounded portion 112 is connected to the valve seat 139. Therefore, when the hydraulic pressure of the inlet port 21 side is lowered from the above described state, the pressure force toward the arrow 126 acting upon the plunger valve 109 is increased. In order to decrease the hydraulic pressure of the outlet port 26 side in proportion to the lowering of the pressure of the inlet port 21 side at the said connected condition, the valve head 110 is moved toward the direction of the arrow 126 by increasing the pressure toward the direction so as to increase the volume of the outlet port 26 side. The value of the diameter of the inner peripheral surface 138 and the resilient deformation characteristics thereof allow the inner peripheral surface 138 to expand by the valve head 110 and the valve head 110 slidably moves in the inner peripheral surface 138 while the sealing function is continued.

Though the value of the sliding movement increases in proportion to the lowered value of the hydraulic pressure of the inlet port 21 side, a certain limit is provided therefor for the reason as will be hereinafter described. In the process of brake releasing operation, the value of the pressure of the inlet port 21 arrives at low level slightly earlier than the value of the pressure at the outlet port 26 by the repulsion force due to the internal deformation of the sealing flange 129 already described above and by the sealing friction. When the inlet port 21 arrives at the slightly low pressure compared with the outlet opening 26, the pressure of the outlet port 26 is oppositely transferred to the inlet port 21 passing through the outside of the lip portion 130 already described.

The function of the deceleration sending mechanism 50 and the control apparatus 150 will be described in detail in the following process of the brake releasing operation, but, as described above, the pressure force acting upon the plunger valve 109 at the time when the pressure at the outlet port 26 passes through the outside of the lip portion 130 and is returned to the inlet port 21 side, and thereby both values of the pressure become approximately equivalent, is substantially kept in its balance, so that it is not urged in the direction of the arrow 126 nor of the arrow 127. Therefor, even after the pressure of the inlet port 21 side vanishes, the valve head 110 is kept in such a state that it has been held by the inner peripheral surface 138. When the plunger valve 109 is held in such state, not only the slight residual hydraulic pressure is kept at the outlet port 26, but even when the brake pressure is again applied, the valve head 110 does not part from the inner peripheral surface 138 until the pressure at the inlet port 21 arrives at a predetermined value, so that the pressure increase at the outlet port 26 is delayed. The actuating spring 107 is provided to eliminate this disadvantage. The repulsion force of the plunger actuating spring 107 releases the plunger valve 109 held by the inner peripheral surface 138 in the brake releasing operation byy overcoming the frictional force between both and provide such a sufficient value as to urge the valve head end 113 onto the annular shoulder 90.

The relationship between the position of the fluid passage 115 provided at the valve head 110 and the position of the flange end 122 against the limiter ring 108 is so provided as to restrain the movement of the plunger valve 109 at the position where the opening of the fluid passage 115 is not engaged with the inner peripheral surface 138 when the valve head 110 slidably moves toward the inner peripheral surface 138 during brake releasing operation, thereby preventing the above opening portion from damaging the inner peripheral surface 138.

The limit of the moving amount of the plunger valve 109 is provided with two sets of portions in dimension so that the reduction of the pressure at the outlet port 26 obtained by the above moving of the valve head 110 when the pressure at the inlet port 21 is released from the upper limit of the pressure of the actual brake operation, is possible in the actual use. The primary object of the reduced diameter portion 120 provided at the plunger valve 109 is, as already described, to reduce the weight for smoothing the movement of the plunger valve 109 for operating in vibration when the pressure at the inlet port 21 side is increased, and the secondary object is to facilitate flow of the brake fluid from the fluid passage 23 to the stepped bore 84 and from the stepped bore 84 to the fluid passage 27 in the stroke range of the plunger valve 109.

On the valve body 20 there are provided openings for introducing the brake hydraulic pressure urged by the primary chamber 4 through the first rear wheel conduit 7 to the proportioning valve apparatus 80 and for reducing the hydraulic pressure directly or proportionally to transmit through the second rear wheel conduit 8 to the rear wheel brakes 10 to receive the normal means for connecting the conduits. The inlet opening 21 having the inlet port threads 30 and the pipe seat 31 out of these openings are introduced through the fluid passage 22 and the fluid passage 23 to the stepped bore 84 so that the outlet port 26 having the outlet port threads 32 and the pipe seat 33 is communicated with the stepped bore 25 through the fluid passage 25 and the fluid passage 24, and the fluid passage 24 is so provided as to coincide with the fluid passage 114 when the valve head end 113 is contacting the annular shoulder 90.

Figure 2:
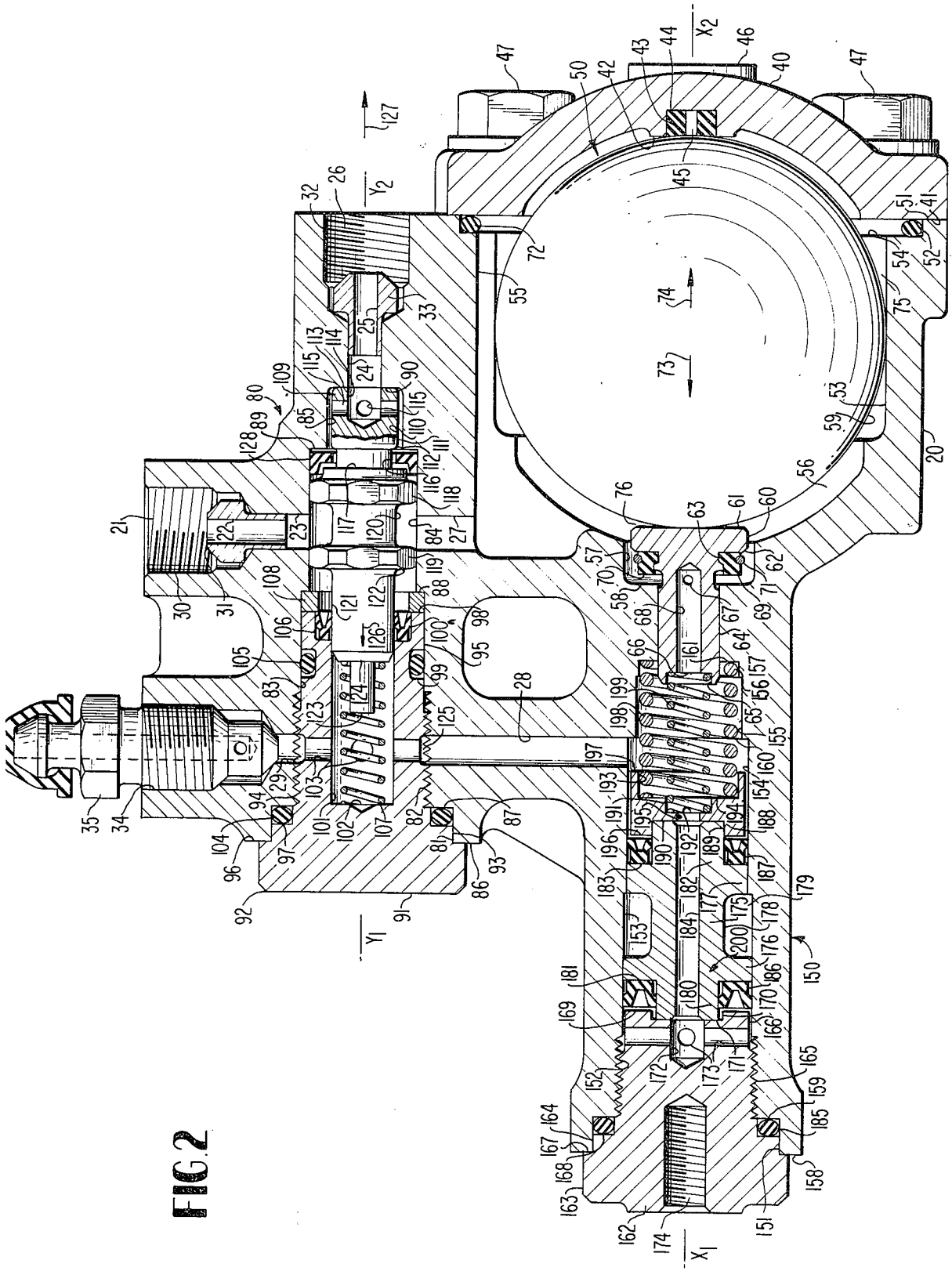
FIG. 2 is a cross sectional view showing the load responsive proportioning pressure reducing valve apparatus of the present invention.

From the foregoing description, as shown in FIG. 2, when the valve seat 139 and the rounded portion 112 are not connected, the brake pressure from the first rear wheel conduit 7 is transmitted through the gap formed by the fluid passage 22, the fluid passage 23, the stepped bore 84, through stepped bore 84 to the opposite side of the upper sliding flange 118, the gap formed by the flange inner peripheral surface 131 and outside circular post of the retaining portion 117, the gap formed by the inner peripheral surface 138 and the neck portion 116, the gap formed by the rounded portion 112 and the valve seat 139, the valve head gap 111, the fluid passage 115, the fluid passage 114, the fluid passage 24 and the fluid passage to the rear wheel second conduit 8.

The brake pressure introduced from the first rear wheel conduit 7 is branched from the stepped bore 84 through the fluid passage 27 into the sensing chamber 75. For this reason, the pressure in the sensing chamber 75 is equal to the value of the pressure urged by the primary chamber 4 together with the pressure in the third stepped bore 84 so that it is not under the influence of the position of the plunger valve 109.

As shown in FIG. 2, when the contact portion 70 is not contacting with the second annular shoulder 58, the pressure in the sensing chamber 75 is transmitted through the fluid passage 67, the fluid passage 68, the stepped bore 155, the stepped bore 154, the fluid passage 28, the fluid passage 125, the fluid passage 103 to the blind bore 101, and at the same time is transmitted through the gap formed by the stepped bore 154 and the outer diameter of the spring retainer 188 into the sealing flange of the cup seal 187 and through the gap formed by the fluid passage 195, fluid passage 184, fluid passage 172, fluid passage 173, the stepped bore 153, and the small stepped extension 166 into the sealing flange of the cup seal 186.

As clear from the foregoing description, as series of fluid passages from the fluid passage 22 through the fluid passage 25 to the second rear wheel conduit 8 form part of the rear wheel brake circuit, but, on the contrary, a series of hydraulic circuit branched from the fluid passage 27 forms a branch circuit not directly concerned with the rear wheel brake hydraulic circuit.

Threaded bleeding port 34 having female threads for receiving the normal bleeder plug 35 in connection thereto is provided in the fluid passage 29 coinciding with the fluid passage 125 provided at the first end plug 91, so as to establish the means for removing the internal air in the second blind fore 101 and the control apparatus 150.

Figure 7:
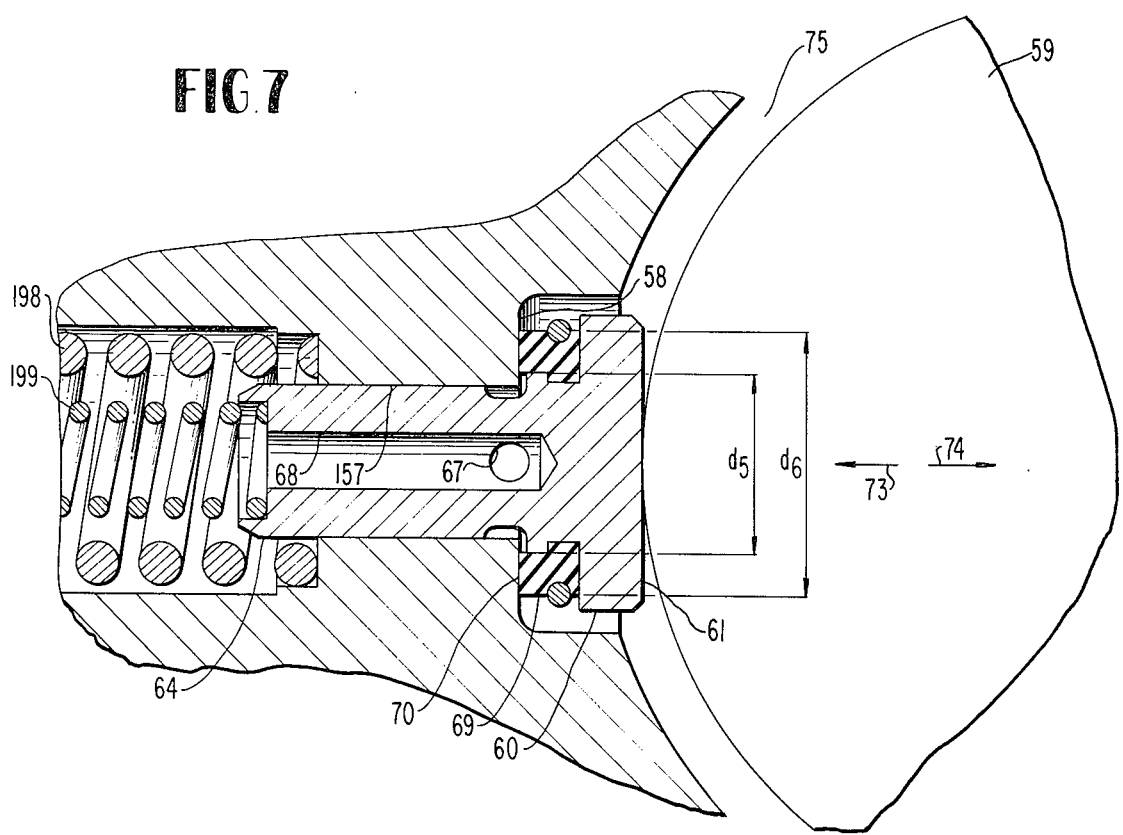
FIG. 7 is a sectional view of the deceleration sensing mechanism shown in FIG. 2.

When the fluid passage between the deceleration sensing mechanism 50 and the control apparatus 150 is closed by the check valve 69 with the inertia force of the deceleration senser 59, as illustrated in FIG. 7, the inertia force $F_1 i$ of the deceleration senser 59 of the weight Wg in the brake fluid induced by $\alpha i = \beta i \cdot g$ (wherein $g$: gravitational acceleration, $\beta i$: deceleration co-efficient) and the repulsion force $S_1 i$ of the senser control spring 199 becomes balanced state when the brakes 9 and 10 are, in turn, pressurized by the brake application of the vehicle under a certain loading condition to be supplied as the brake hydraulic pressure arrives at the brake pressure PC$i$ preset in advance of the deceleration speed of the vehicle corresponding thereto and at the deceleration $\alpha i$. The following balance relation is consistent at the limit that the contact portion 70 approaches the annular shoulder 58 under the above conditions:

$$F_1 i = WG \cdot \beta i$$
$$S_1 i = WG \cdot \beta i \qquad 1.$$

The movement of the check valve plunger 60 is further advanced; and assuming that the areas formed by the small sealing diameter $d_5$, larger sealing diameter $d_5$, and the respective sealing diameter formed by contacting the contact portion 70 with the annular shoulder 58 are represented by $A_5 \cdot A_6 (A_5 - A_6)$, the force acting upon the ckeck valve plunger 60 becomes the following:

$$S_1 i + PCi \cdot A_5 < WG \cdot \beta i + PCi \cdot A_6 \qquad 2.$$

Here, the left side of the formula (2) is the force toward arrow 74 acting onto the check valve plunger 60 from the side of the control apparatus 150, and the right side of the formula (2) is the force toward arrow 73 acting onto the check valve plunger 60 from the side of the sensing chamber 75. Therefore, the formula (2) shows that as long as the inertia force of the deceleration senser 59 and the pressure in the sensing chamber 75 are more than the aforementioned valve, the sealing function of the fluid passage of the check valve 69 continues to maintain the pressure PC$i$ sealed in the control apparatus 150.

The function of the proportioning valve apparatus 80 will be herinafter described in detail, but the pressure modulating starting point of the proportioning pressure is determined by the force of the following formula acting onto the lower stem 121 by the operating force of the plunger actuating spring 107 (the repulsion force of the spring 107 when the rounded portion 112 moves the plunger valve 109 until it contacts the valve seat 139) and the sealed pressure PC$i$ sealed in the control apparatus 150, and the pressure PC$i$ is the main function, and the is the sub-function.

$$(PCi + S_3/A_2)A_2 \qquad 3.$$

wherein $A_2$ is the sectional area of the lower stem 121.

The formula (3) shows that the proportioning pressure reducing operation starts from the time the pressure introduced into the inlet port 21, is higher, by $S_3/A_2$, than the value PC$i$ when the above fluid passage is closed by the check valve 69. The actuating force upon the check valve plunger 60 at the starting point of the proportioning pressure reducing is as follows:

$$S_1 i + PCi \cdot A_5 << WG \cdot \beta i + (PCi + S_3/A_2)A_6 \qquad 4$$

In other words, as long as the pressure introduced into the inlet port 21 is over the pressure modulating starting point of the proportioning pressure reducing and over the pre-set deceleration speed $\beta i$, it shows that the closing of the fluid passage by the check valve 69 is continued so that the pressure in the control apparatus 150 is maintained.

It is preferably that the closing of the fluid passage is continued until the hydraulic pressure in the sensing chamber 75 is re-set to that of the starting point of the proportioning pressure reduction, even during brake releasing operation. The check valve 69 holds the fluid passage closed even during deceleration of the vehicle in the region where the proportioning pressure reducing is in effect. The requirement for performing this is to add a further object for strongly consisting the conditions of the formula (4) in addition to the object as already described with the provision of the operating load of the plunger actuating spring 107 so as to cooperate with the effect of the sealing effective areas $A_5$ and $A_6$ caused by the shape of the contact portion 70.

A consideration for compensating the delay of the operation of the deceleration senser 59 at the time of quick pressurizing brake operation is conducted in the check valve plunger 60 of the present invention. A delay in rising of the generation of the decelerating speed of the vehicle takes place in comparison with the accelerating speed of the pressure supplied to the sensing chamber 75 and the brakes 9 and 10 at the brake pressurizing operation extremely fast conducted actually, the aforementioned PC$i$ and $\beta i$ are not synchronized with the timing axis so that the deceleration senser 59 detects a predetermined decelerating speed, and at the time point when the check valve 69 is closed by the inertia force thereof, the pressure sealed in the control apparatus 150 exceeds the set value PC$i$ with the result that the proportional reducing pressure characteristics not adapted approximately with an ideal brake pressure curve is performed. In this invention, in order to compensate the problems of this region, a gap formed between the stepped bore 157 and the plunger stem 64, provision of the fluid passage effective sectional area of the fluid passage 67, and gap 76 at the connecting portion of the head face 61 and the deceleration senser 59 are conducted, and the plunger stem 64 acts as a piston operation at the quick pressurizing time so that the fluid passage is closed by the check valve 69 before the inertia force of the deceleration senser 59 arrives at $F_1 i$.

The load responsive proportional pressure reducing valve 14 is mounted such that the axis $X_1 - X_2$ for connecting the deceleration sensing mechanism 50 to the control apparatus 150 is parallel to the direction of vehicle travel and disposed horizontally. The arrow 73 concide with the advancing direction of the vehicle. The proportioning valve apparatus 80 is disposed above the axis $X_1 - X_2$ to facilitate the easy removal of the air at the filling of the brake fluid.

The threaded blind bore 174 not passing through the second end plug 162 and the threaded blind bore (not shown) not passing similar to the above provided to the fixed boss 46 is referred with the mounting means used for mounting the apparatus to the vehicle.

Figure 8:
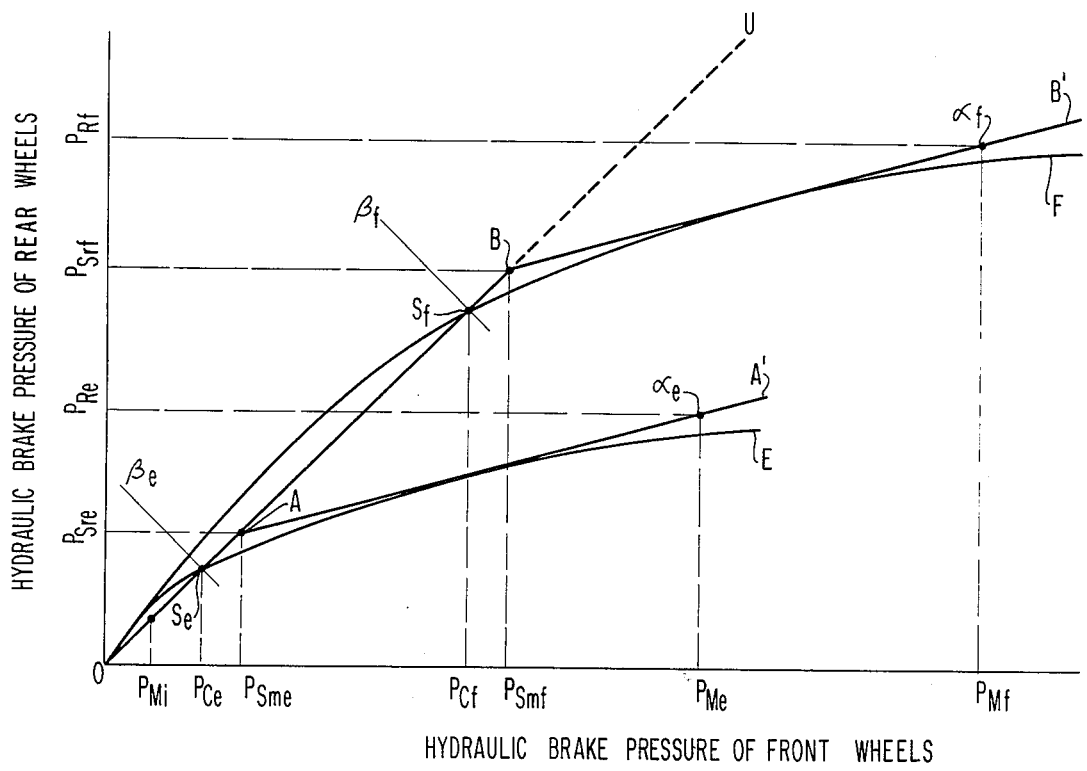
FIG. 8 is a graph showing the relationship between the hydraulic brake pressures on the front and rear brakes.

In the orthogonal coordinate in FIG. 8 representing the rear wheel brake pressure at ordinate and the front wheel brake pressure at abscissa, the straight line OU represents the relation of the brake pressure of the front and rear wheels of the typical brake apparatus supplied with the brake pressure energized by the chambers 4 and 5 of the tandem master cylinder 3 directly to the brakes 9 and 10 corresponding thereto so that the pressure induced at the primary chamber 4 and the secondary chamber 5 by the force 2 are regarded as substantially equivalent. Therfore, this line OU is considered to have angle of 45° with respect to both axis of the coordinate, and accordingly the line OU will now be hereinafter called as 45° line.

The approximate hyperbola OE and OF represent the ideal relationship between the rear wheel brake pressure and the front wheel brake pressure at no and full load of the loading conditions of any vehicle on the orthogonal coordinate, so that the former is called no load ideal brake pressure curve, and the latter is called full load ideal brake pressure curve. It is well known that the optimum brake effect at the respective loading conditions is preformed by supplying the brake pressure to the brakes 9 and 10 along the ideal brake pressure curve. It is also well known that these ideal brake pressure curve of any vehicle has a maximum deceleration obtained on the road surface having assumed frictional coefficient as a parameter to show the relationship between the brake characteristics at the respective wheels and the brake pressure to be given for all the wheels to reach the lock state at the same time responsive to the distributed weight of the vehicle.

In the brake apparatus of the actual vehicle, it is impossible to make the pressures supplied to the front and rear wheel brakes coincide with the ideal brake pressure curves responsive to the optimum deceleration, but the 45° line is bent at proper position only for the ideal brake pressure curve corresponding to only one loading condition. The proportional pressure reducing valve having the function approximately adapted therefor is broadly used. The load responsive proportioning pressure reducing valve of the present invention has expanded the function of the above standard proportioning pressure reducing valve and has a feature to perform the above bending characteristics approximately adapted for the ideal brake pressure curve is response to the loading conditions of all the region determined for the vehicle.

The straight lines AA' and BB' shown in FIG. 8 are proportioning pressure reducing lines approximately adapted with the same pressure reducing ratio (oblique) with respect to the no load ideal brake pressure curve and full load ideal brake pressure curve.

The load responsive proportioning pressure reducing valve 14 controls the relation of the brake pressure supplied to the front and rear wheels along bent line OAA' at the no load state of the loading condition, by the bent line OBB' at the full load state, and by the bent line existing between both bent lines at the intermediate loading state.

The crossing point of the no load ideal brake pressure curve and full load ideal brake pressure curve with respect to the 45° line are represented by S$e$ and S$f$, and the deceleration coefficients corresponding thereto are by $\beta e$ and $\beta f$ (wherein the relationship between the deceleration and the deceleration coefficient $\alpha e = \beta e \cdot g$, $\alpha f = \beta f \cdot g$ :gravitational acceleration), the front wheel brake pressure by PC$e$·PC$f$. The front and rear wheel brake pressure in response to the crossing points A and B of the proportioning pressure reducing line and the 45° line are PS$me$=PS$re$, PS$mf$ = PS$rf$ and any point on the proportioning pressure reducing lines $\alpha e$ and $\alpha f$, and the front and rear wheel brake pressure corresponding to the respective points are by [PM$e$,PR$e$] and [PM$f$,PR$f$].

When the brake pressure introduced into the inlet port 21 is any pressure PM$i$ until it arrives at PC$e$ (wherein PM$i$<PC$e$), the PM$i$ is supplied from the outlet port 26 through the fluid passage as already described to the rear wheel brakes 10 at the same time through the fluid passage as already described, sensing chamber 75, control apparatus 150 and blind bore 101 to be.

The mounting load of the operation load of the plunger actuating spring 107 as already described is represented by $S_3 - K_3 \cdot dy$ by the moving amount dy of the plunger valve 109 toward the arrow 126 and the spring constant $K_3$ of the spring 107 when the gap formed by the rounded portion 112 and the valve seat 139 is closed.

When the pressure in the stepped bore 84 acting toward the pressure receiving effective area $A_2$ of the lower stem 121 sealed by the cup seal 106 is equal to the pressure in the blind bore 101, the plunger valve 109 is urged toward the direction opposite to the arrow 127 by the mounting load $S_3 - K_3 \cdot dy$ of the plunger actuating spring 107 so that the fluid passage between the inlet port 21 and the outlet port 26 continues to be in opened state.

The pressure PM$i$ supplied into the control apparatus 150 acts onto the pressure receiving effective area $A_4$ of the larger diameter piston 176 and the pressure receiving effective area $A_3$ of the smaller diameter piston 177 (wherein $A_3 < A_4$), so that the composite force PM$i$ ($A_4 - A_3$) acts to urge the differential piston 175 toward the direction opposite to arrow 74.

It is described in order to simply explain the operational function of the apparatus of the present invention so that the displacement may not take place at the differential piston 175 until the pressure P of the starting point of the operation of no load proportional reducing pressure is sealed in the control apparatus 150, however this provision may be freely changed. For example, it is easily understood that assuming that the loading condition is near empty, displacement is not taken place at the differential piston 175 with easiness.

One function of the adjusting spring 198 is to control the pressure for starting the movement of the differential piston 175 in the control apparatus 150, that is, the following relation is sufficient between the operating load $S_1e$ of the sensor control spring 199 and the mounting load $S_2$ (wherein the operating load is represented by $S_2e$, $S_2 = S_2e$ from the aforementioned conditions) as will be described hereinafter so that the operating force of the differential piston 175 becomes in the balanced state when the pressure in the control apparatus 150 arrives at PC$e$:

$$PCe\,(A_4-A_3) = S_1e - S_2e \qquad 5$$

The first feature of the apparatus of this invention is the function for operating in sensing the decelerating speed provided in advance by the deceleration sensor 59 to move the check valve 69 to closed position as already described. If one of this set decelerating speed is the value $\alpha e$ (wherein $\alpha e = \beta e \cdot g$) obtained by supplying the brake hydraulic pressure PC$e$ to the respective brakes 9 and 10 at no load state of the loading condition so that the check valve 69 is moved by the amount $dx$ by the inertia force $F_1e$ produced upon sensing with the $\alpha e$ by the deceleration sensor 59 of the weight Wg in fluid and when it is arrived to the closed position, the operating load $S_1e$ of the sensor control spring 199 having the spring constant $\beta_1$ is balanced with the inertia force $F_1e$, the following formulae must be satisfied. however $F_1e = S_1e$
therefore $$F_1e = WG \cdot \beta e$$

$$S_1e = WG \cdot \beta e \qquad 6$$

and, the relationship between the mounting weight $S_1$ of the sensor control spring 199 and the operating load $S_1e$ $$S_1 = S_1e - k_1 \cdot dx \qquad 6'$$

$$S_1 = WG \cdot \beta e - k_1 \cdot dx \qquad 7$$

Wg and $dx$ of the respective items of the right side formula of the formula (7) are the value to be determined at the step of structural design of the apparatus of the present invention, and $\beta e$ is the value easily determined from the no load ideal brake hydraulic pressure curve of the objective vehicle. $k_1$ is the value determined by the provision of the full load proportioning pressure reducing line approximately adapted for the no load ideal brake pressure curve and the full load ideal brake pressure curve as will be hereinafter described. Therefore, when the set condition of the sensor control spring 199 satisfies the formula (7) under the brake conitions as described above, the check valve 69 becomes the state shown in FIG. 7, so that the fluid passage formed between the deceleration sensing mechanism 50 and the control apparatus 150 is closed so as to seal the pressure PC$e$ in the control apparatus 150.

The second feature of the apparatus of the present invention is that the starting point of the operation of the proportioning pressure reducing is controlled by the sealing pressure PC$e$.

The actuating force to the plunger valve 109 at the time point when the check valve 69 is closed is:
in the direction opposite to arrow 127:

$$PCe \cdot A_2 + (S_3 - k_3 \cdot dy)$$

in the direction of arrow 126:

$$PCe \cdot A_2$$

and accordingly the fluid passage from the inlet port 21 to the outlet port 26 by the composite force $S_3 - k_3 \cdot dy$ is held in opened state, but when the pressure introduced into the inlet port 21 is further increased to reach PC$e$ and to satisfy the following relation:

$$PSme - PCe = S_3/A_2 \qquad 8$$

the actuating force to the plunger valve 109 is:
in the direction opposite to the arrow 127:

$$PCe \cdot A_2 + (S_3 - k_3 \cdot dy) \rightarrow (PCe + S_3/A_2)A_2 - k_3 \cdot dy$$

in the direction of arrow 126:

$$PSme \cdot A_2 \rightarrow (PCe + S_3/A_2)A_2$$

it is displaced by the displacement $dy$ in the direction of the arrow 126, and it is balanced at the position where the rounded portion 112 is contacted with the valve seat 139 to close the fluid passage from the inlet port 21 to the outlet port 26.

When the sealing effective area formed by contacting the rounded portion 112 with the valve seat 139 is represented by $A_1$ the actuating force to the plunger valve 109 at the point A in FIG. 8 is:
in the direction opposite the arrow 127:

$$(PCe + S_3/A_2)A_2 + PSme\,(A_1 - A_2)$$

in the direction of the arrow 126;

$$PSre \cdot A_1$$

Since the plunger valve 109 is in balanced state, $$PSre \cdot A_1 = PSme\,(A_1 - A_2) + PCe \cdot A_2 + S_3 \qquad 9$$

wherein $$PSre = PSme \cdot (A_1-A_2)/A_1 + (PCe \cdot A_2+S_3)/A_1 \quad 9'$$

When the hydraulic pressure introduced into the inlet opening 21 is further increased by $\Delta Pm$, it becomes as follows from the condition of closing the fluid passage:

$$PSre \cdot A_1 < (PSme + \Delta Pm)(A_1-As)+PCe \cdot A_2+S_3 \quad 10$$

so that the balancing conditions are broken with the result that the rounded portion 112 is separated from the valve seat 139. As a result, it becomes again the balanced condition by transmitting part $\Delta Pr$ of the increased pressure $\Delta Pm$ of the inlet port 21 side to the outlet port 26 side, and if the fluid passage is closed, the following conditions are consisted:

$$(PSre+\Delta Pr) \cdot A_1 = (PSme+\Delta Pm)(A_1-A_2)+PCe \cdot A_2+S_3 \quad 10$$

from the formulae (10) - (9), $$\Delta Pr = \Delta Pm \cdot \frac{A_1 - A_2}{A_1} \quad 11$$

The formula (11) shows the fact that the fluid passage is again closed by the fact that the pressure introduced into the inlet port 21 exceeds the PSme and to increase the increment $\Delta Pm$, in turn, so that the pressure $\Delta Pr$ reduced at a constant rate determined by $A_1$ and $A_2$ is discharged to the outlet port 26 side, and shows that the inclination of the no load proportioning pressure reducing line AA' with respect to the front wheel brake pressure axis, that is its reduction ratio is $(A_1 - A_2)/A_1$.

Therefore, by substituting the front and rear wheel brake pressure PMe and PRe corresponding to any point Ae on the no load proportioning pressure reducing line AA' to the formula (9'), the no load proportioning pressure reducing line is expressed by the following general formula:

$$PRe = PMe \cdot \frac{A_1 - A_2}{A_1} + \frac{PCe \cdot A_2 + A_3}{A_1} \quad 12$$

The relation at the point A of the formula (12) of PMe=PRe at the starting point of the operation of the proportioning pressure reducing, that is the crossing point of the no load proportioning pressure reducing line from the characteristics of the 45 degrees line is shown by the formula as follows:

$$PMe = PCe + \frac{A_3}{A_2} \quad 13$$

The formula (13) is represented as the general formula of the formula (8). The formulae (12) and (13) shows that the same proportioning pressure reducing function as that of the proportioning pressure reducing valve normally known by the principle and mechanism of the apparatus of the present invention is performed, and its reduction ratio is determined by the constants $A_1$ and $A_2$, and the starting point of the operation of the no load proportional reducing pressure is the function of the pressure PCe acting onto the end surface of the lower stem. 121.

The third feature of the apparatus of the present invention is the function that the relation of the pressure between the inlet port 21 and the output port 26 is on the proportioning pressure reducing line so that the pressure of the inlet port 21 side is lowered, to overcome the step of operation of the brake pressure reducing.

When the relation of the pressure at the inlet port 21 and the outlet port 26 satisfies the formula (12) as already described, the fluid passage between both ports are balanced in closed condition, and under such a condition, when the pressure at the inlet port 21 side is lower by the amount $\Delta Pm$, the following inequality formula is consisting:

$$PRe \cdot A_1 > (PMe - \Delta Pm)(A_1 - A_2) + PCe \cdot A_2 + S_3 \quad 14$$

This unbalanced force becomes the pushing force for further pushing the plunger valve 109 in the direction of arrow 126, and as already described the valve head 110 expands the inner peripheral surface 138 so that while the sealing function between both is held to move the balanced position in the direction of arrow 126. If this new moving amount to the balanced position is presented by $\Delta y_1$, the lowering of the pressure caused by the expansion of the volume of the outlet port 26 side is induced thereby. When the pressure pf the outlet port 26 side is lowered by the amount $\Delta Pr$ by the movement $\Delta y_1$, if it reaches a new balanced state, the balancing condition of the actuating force for the plunger valve 109 becomes as follows:

$$(PRe-\Delta Pr)A_1 = (PMe-\Delta Pm)(A_1-A_2)+\\ PCe \cdot A_2+(S_3+k_3 \cdot \Delta y_1) \quad 15$$

from the formulae (15) − (12), $$\Delta Pr = \Delta Pm \frac{A_1 - A_2}{A_1} - \frac{k_3}{A_1} \cdot \Delta y_1 \quad 16$$

The formula (16) shows the relation of the change of the pressure of the outlet opening 26 side in response to the change of the pressure at the inlet opening 21 side when the affection by the change of the hydraulic pressure PCe acting onto the lower stem 121 is omitted at the step of the operation of the pressure reducing of the apparatus of the present invention.

The relation of the change of the pressure at both ports 21 and 26 is clear by comparing the formula (11), showing the state of the step of the operation of pressurization, with the formula (16), showing the state of the step of the operation of the reducing pressure, and the changed amount $\Delta Pr$ of the outlet port 26 side becomes smaller by the amount of the second item of the right formula of the formula (16) at the step of the operation of reducing pressure than the changed amount $\Delta Pm$ of the same value of the inelt port 21 side. This shows that the proportioning pressure reducing line, at the step of the operation of the pressure reducing, is biased at the high pressure side of the rear wheel brake pressure axis with respect to the proportioning pressure reducing line at the step of the operation of pressurization, so that the difference therebetween is proportional to the $\Delta y_1$ (not shown). This phenomenon is called hysteresis of the proportioning pressure reducing characteristic line gnerally including the change of the Pce as will be described hereinafter. However, this hysteresis may be restrained to the region where it is not actually detrimental by providing $k_3/A_1$ sufficiently small from the formula (16). As the pressure is lowered continuously at the inlet port 21 side, the plunger valve 109 moves in the direction of arrow 126 so that the pressure at the outlet port 26 side is lowered proportionally in relation to the formula (16), but this function is prevented by contacting the flange end 122 with the limiter ring 108 for the reason as described already and by the mechanism as shown so as to stop the movement of the plunger valve 109 in the direction of arrow 126. The allowable moved amount $Y_1$ of the plunger valve 109 until the flange end 122 contacts the limiter ring 108 from the position where the rounded portion 112 is connected to the valve seat 139, is so provided as to lower in the state that the pressure of the outlet port 26 side satisfies the formula (16) until the lowering of the pressure reducing of the inlet port 21 side reach near the starting point A of the operation of the proportioning pressure reducing when it is operated from the region of the brake pressurizing normally operated in pressure reducing operation, but even when the pressurizing operation exceeding the brake pressurizing region assumed is conducted, the phenomenon generated at the step of the operation of the reducing pressure is recognized by the following description as that it does not affect substantially the operation of the vehicle.

At the operation of pressure reducing under the above conditions, the contact of the flange end 122 with limiter ring 108 is conducted before the pressure of the inlet port 21 side is returned to near the point A, and thereafter the relation of the formula (16) is broken so that the phenomenon of lowering pressure reducing of the outlet port 26 side is stopped proportional to the lowering of the pressure reducing of the inlet port 21 side. In other words, the proportioning pressure reducing line after the contact of the flange end 122 with the limiter ring 108 at the operation of the pressure reducing becomes parallel with the front wheel brake pressure axis (not shown). As the pressure is continuously lowered at the inlet port 21 side, the above parallel line crosses the 45° line to continue until the position where it slightly crosses therewith. When the proportioning pressure reducing line at the operation of the pressure reducing is thus crossed with the 45° line slightly, the pressure at the outlet port 26 side becomes in higher level by the crossed amount than the pressure of the inlet port 21 side. Under such conditions, when the pressure force by the difference dP of both the pressure covercome the tension of the sealing flange 129 as described already, the pressure of the outlet port 26 side counterflows at the inlet port 21 side through the outside of the lip portion 130. The difference of the pressure between the inlet port 21 side and the outlet port 26 side is held with slight amount related to the tension of the sealing flange 129 as already described by this counterflow. Therefore, the relation of both the pressure during counterflowing through the outside of the lip portion 130 approaches the 45° line to become the parallel line (not shown) passing the upper portion.

Even after the plunger valve 109 is displaced by the amount $Y_1$, the pressure PCe acting onto the end surface of the lower stem 121 may not change. When the pressure of the inlet port 21 side is lowered to the PSme, the force acting to the plunger valve 109 becomes as follows:

in the direction opposite to the arrow 127:

$$PSme(A_1-A_2)+PCe \cdot A_2+S_3+k_3 \cdot Y_1$$

in the direction of arrow 126:

$$(PSme + dP)A_1$$

If the valve head 110 engaged with the inner peripheral side 138 is pushed out by the force acting on the plunger valve 109, its condition is as follows:

$$(PSme+dP)A_1 \leqq PSme(A_1-A_2)+PCe \cdot A_2+S_3+k_3 \cdot Y_1$$

$$(PSme-PCe)A_2+dP \cdot a_1 \leqq S_3+k_3 \cdot Y_1 \qquad 17$$

If the condition of the formula (8) is substituted to the formula (17), $$dP \leqq \frac{k_3}{A_1} \cdot Y_1 \qquad 18$$

When the relation of the difference of both the pressure at the step of the pressure reducing satisfies the formula (18), the valve head 110 is separated from the inner peripheral surface 138 so that the fluid passage between both is released with the result that the relationship of the pressue of both ports returns to the state represented by 45° line. It is assumed that the pressure acting onto the lower stem 121 is constant in order to simplify the description of the formulae (16) and (18) showing various relation of the steps of operation of pressure reducing, but as to the case that the condition where PCe varies is added, it is readily recognized from the conntent of the variation of PCe as will be hereinafter described.

The displacement of the plunger valve 109 in the direction of the arrow 126 at the step of the operation of brake pressure reducing the volume of the chamber formed by the control apparatus 150 and blind bore 101 sealed by the check valve 69 with the result that the pressure PCe in the chamber is abruptly increased so that the displacement of the plunger valve 109 in the direction of the arrow 126 is prevented in induction.

The fourth feature of the apparatus of the present invention is that the means for preventing the plunger valve 109 from removing the cause for preventing the movement in the direction of the arrow 126 thereof.

Figure 9:
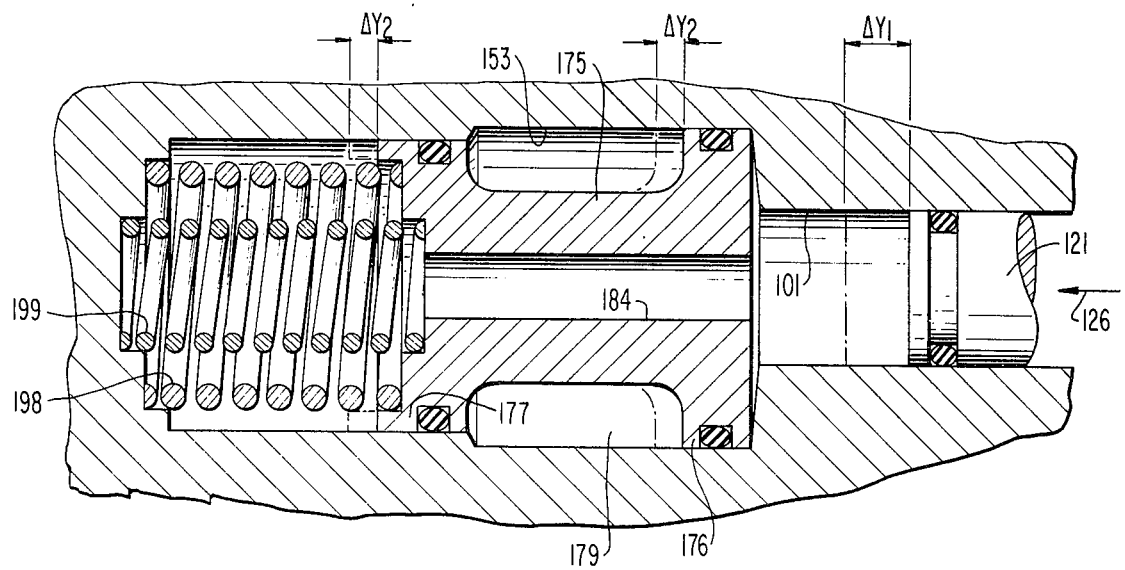
FIG. 9 is an enlarged sectional view of a portion of the embodiment of the control apparatus according to the instant invention.

FIG. 9 shows partial structure of the apparatus shown in FIG. 2 in principle for the explanatory purpose of the feature, and it shows the case that the front and rear wheel brake pressure is in relation shown by the point Ae in FIG. 8 at the step of operation of brake pressurizing. Assuming that when the lower stem 121 is displaced in the direction of arrow 126 by $\Delta y_1$ based on the aforementioned reason by reducing the pressure of the inlet port 21 side from the state shown in the drawing, the pressure in the chamber is increased by $\Delta P$ and that the differential piston 175 displaces by $\Delta y_2$ balanced with the increased repulsion force of the sensor control spring 199 having spring constant $k_1$, for supporting it and the adjusting spring 198 having spring constant $k_2$ by the increased pressure $\Delta P$. If it is assumed the lower stem 121, displaced by $\Delta y_1$, by the operating mechanism as above, is supported not only by the sealed noncontractible brake fluid, but is supported also by the resiliency having spring constant K through the brake fluid, then the following relation exists:

$$K = \frac{\Delta P}{\Delta y_1} \cdot A_2 \qquad 19$$

The following relation exists from the balanced condition of the force acting onto the differential piston 175:

$$\Delta P = \frac{k_1 + k_2}{A_4 - A_3} \cdot \Delta y_2 \qquad 20$$

Since the stroke volume of the lower stem 121 and that of the differential piston 175 must become equivalent under the condition that the brake fluid is incompressible, the following formula exists:

$$\Delta y_1 = \frac{A_4 - A_3}{A_2} \cdot \Delta y_2 \qquad 21$$

The stroke volume of the lower stem 121 is absorbed by the stroke volume of the differential piston 175, but if the one for adsorbing the stroke volume of the differential piston 175 is not provided, the formula (21) does not exsists. The air chamber 179 is provided for this purpose. It is clear that the formula (21) is consisting by providing the air chamber 179 having larger volume sufficient in comparison with the stroke volume $(A_4 - A_3) \cdot \Delta y_2$ of the differential piston 175 or the air passage for communicating with the atmosphere at proper position of the air chamber 179.

If the formulae (20) and (21) are substituted to the formula (19), the following formula exists:

$$K = \frac{A_2^2}{(A_4 - A_3)^2} \cdot (k_1 + k_2) \qquad 22$$

The formula (22) indicates that when the plunger valve 109 is displaced in the direction of the arrow 126 by the apparatus of the present invention so as to constrict the sealed pressure PC$e$, its pressure PC$e$ is supported by the resiliency having extremely small spring constant K determined by the constants $A_2$, $A_3$, $A_4$, $k_1$ and $k_2$ to perform effectively the function of the operation of the brake reducing pressure. The increased amount $\Delta P$ of the pressure in the chamber produced by the displacement $\Delta y_1$ of the lower stem 121 may be represented as the function of $\Delta y_1$ of the lower stem 121 by the formulae (20) and (21) as follows:

$$\Delta P = \frac{A_2 (k_1 + k_2)}{(A_4 - A_3)^2} \cdot \Delta y_1 \qquad 23$$

The proportioning pressure reducing characteristic added with the varying condition of PC$e$ may be obtained as the following formula by substituting the formula (23) to the formula (15) showing that the pressure PC$e$ in the chamber is not varied by the displacement of the plunger valve 109:

$$\Delta Pr = \Delta Pm \cdot \frac{A_1 - A_2}{A_1} - \frac{k_3}{A_1} \cdot \Delta y_1 - \frac{A_2^2 (k_1 + k_2)}{A_1 (A_4 - A_3)^2} \cdot \Delta y_1 \qquad 16'$$

In consideration with the comparison of the formula (11) showing the relation of the pressurizing operation, the formula (16) showing the relation at the pressure reducing operation and the formula (16') as to the relation of varying pressure at the inlet port 21 side and the outlet port 26 side at the region of the pressure over the starting point of the operation of the proportioning pressure reducing, it is already dexcribed that $\Delta Pr$ of the formula (16) is smaller by the second item of the right side formula of the formula than the same value of the $\Delta Pm$, it show that $\Delta Pr$ of the formula (16') is smaller by the third item of the right side formula thereof than the formula. The second and third items of the right side formula of the formula (16') showing the relation of the variation of the pressure at the operation of the reducing pressure corresponding to the formula (11) showing the relation of the variation of the pressure at the operation of pressurizing indicate the hysteresis produced at the operation of reducing pressure of the load responsive proportioning pressure reducing valve shown as reference example of the apparatus of the present invention.

The fifth feature of the apparatus of the present invention is a provision for performing the proportioning pressure reducing characteristic approximately adapting with the same reduction ratio as the ideal brake pressure curve corresponding to a given loading condition, when the loading condition is varied, by providing, so that when the loading condition is in no load state, proportioning pressure reducing characteristic approximately adapted for the proper reduction ratio for the ideal brake pressure curve may be performed as already described.

It is necessary that the brake pressure imparted to the brakes becomes high pressure together with the increase of the loading weight in order to produce a constant deceleration to the vehicle by the brake operation, and the deceleration responsive to the crossing point of the 45° line and the ideal brake pressure curve becomes high level together with the increase of the loading weight as well known. Therefore, there is the relationship of between the decelerating speeds $\alpha e$ and $\alpha f$ corresponding to the crossing point of the 45 degrees line, no load ideal brake pressure curve and full load ideal brake hydraulic curve shown in FIG. 8 (wherein $\alpha e = \beta e \cdot g, \alpha f = \beta f \cdot g$). The property of the full load ideal brake pressure curve is considered in order to provide the proportioning pressure reducing ratio and the no load proportioning pressure reducing line with respect to the no load ideal brake pressure reducing line having the same proportioning pressure reducing is determined to approximately adapt in the range allowable actually for the ideal brake pressure of both.

Though the deceleration sensing point at both loading conditions is put at the deceleration corresponding to the crossing point of the ideal brake hydraulic pressure curve and 45° line in order to simplify the description of this invention, it is actually not always limited only to this point. It is clear that any one or both of deceleration sensing points may be set to the proper portion.

When the deceleration $\alpha f(=\beta f \cdot g)$ corresponding to the crossing point of the ideal brake hydraulic pressure curve and 45° line in order to simplify the description of this invention, it is actually not always limited only to this point, it is clear that any one or both of deceleration sensing points may be set to proper portion except the above.

When the deceleration $\alpha f(=\beta f \cdot g)$ corresponding to the crossing point $Sf$ of the 45° line and the full load ideal brake pressure curve is the set deceleration of the deceleration sensor 59 at the full loading and the brake pressure required for generating the deceleration is by $PCf$, the relationship between the value of the pressure and the pressure $PSmf$ corresponding to the starting point of the operation of the proportioning pressure reducing at full loading consists of the following relation by the plunger actuating spring 107 and its peripheral functional conditions are already described:

$$PSse-PCe=PSmf-PCf=S_3/A_2 \qquad 24$$

It was already described that when the deceleration of the vehicle arrives at the $\alpha e(=\beta e \cdot g)$ at no loading state, the check value 69 is closed by the deceleration sensor 59, and the operation weight $S_1 e$ of the sensor control spring 199 is obtained by satisfying the formula (6). Similarly, if the operating weight of the sensor control spring 199 varies from $S_1 e$ to $S_1 f$ by means as will be described hereinafter, as the check valve 69 is closed by the deceleration sensor 59 when the deceleration of the vehicle arrives at $\alpha f(=\beta f \cdot g)$ in the full loading state, the following formula is consisted:

$$S_1 f = WG \cdot \beta f \qquad 25$$

It is already described that when the decelerating speed $\alpha e$ is provided by giving the brake pressure $PCe$ to the respective brakes 9 and 10 at the no loading state, whereby the check valve 69 is displaced by $dx$ with the result that the fluid passage is closed, in order that the relationship between the mounting load $S_1$ and operating load $S_1 e$ of the sensor control spring 199 satisfies the formula (6′), and the differential piston 175 may be balanced at the original position by the pressure $PCe$ acting thereat, the operating load $S_2 e$ of the adjusting spring 198 acting in cooperation with the pressure $PCe$ (this operating load $S_2 e$ is equivalent to the mounting load $S_2$ under the above conditions) and the operating load $S_1 e$ of the sensor control spring 199 must satisfy the formula (5). If the brake pressure $PCf$ is given to the respective brakes 9 and 10 at full loading state in response to the above operating function to produce the deceleration $\alpha f$, in order to operate the same as above by the check valve 69, the above pressure $PCf$ acts onto the effective area difference $A_4 - A_3$ so that the differential piston 175 is displaced by $\Delta X$ in the direction opposite to the arrow 74, and the pressure is arrived at the balanced state with new operating loads $S_2 f$ and $S_1 f$ of the adjusting spring 198 and the sensor control spring 199 acting in cooperation with each other, the following formula exists:

$$PCf(A_4-A_3)=S_1 f+S_2 f \qquad 26$$

The relationship between the mounting load $S$ and the operating load $S_1 f$ of the sensor control spring 199 is as follows:

$$S_1 = S_1 f - k_1(dx+\Delta X) \qquad 27$$

Then, $$S_1 f - S_1 e = k_1 \cdot \Delta X \qquad 28$$

from the formulae (25) − (26), $$S_1 f - S_1 e = WG(\beta f - \beta e) \qquad 29$$

When the loading condition is in no load state, the deceleration sensor 59 senses by the deceleration $\alpha e$ and by the deceleration $\alpha f$ produced by the brake pressure $PCf$ when the loading condition is in full state, the condition of the spring constant $k_1$ of the sensor control spring 199 for closing the fluid passage to operate the check valve 69 may be set as follows from the formulae (29) and (29):

$$k_1 = \frac{W_G}{\Delta x}(Bf - Be) \qquad 30$$

$\beta f$ and $\beta e$ of various items of the right side formula of the formula (3) are the values easily determined from the provision of the ideal brake pressure curve of the objective vehicle and the proportioning pressure reducing characteristic line corresponding thereto, and $W_G$ and $\Delta x$ and the values determined from the structure of design when the loading condition is in full loading state. According to the brake pressure $PCe$ of the case that the loading condition is in no load state, in order that the differential piston 175 is balanced at the original position, and the check valve 69 is in the above operating state, and the differential piston 175 is displaced by $\Delta x$ depending upon the brake hydraulic pressure $PCf$ of the case that the loading condition is in full loading state to become in balanced state and the check valve 69 is in the operating state, the following conditions must be satisfied, that is, from the formulae (5) and (6), $$S_2 e = Pce \, e \, (A_4 - A_3) - Wg \cdot \beta e \qquad 31$$

from the formulae (25) and (26), $$S_2 f = Pcf(A_4 - A_2) - Wg \cdot \beta f \qquad 32$$

from the formulae (31) and (32), $$S_2 f - S_2 e = (Pcf - Pce)(A_4 - A_3) - Wg(\beta f - \beta e) \qquad 33$$

Assuming that the spring constant of the adjusting spring 198 is represented by $k_2$, from the above conditions, $$S_2 f - S_2 e = k_2 \cdot \Delta x \qquad 34$$

Therefore, in order to satisfy the above conditions, the conditions of the spring constant $k_2$ of the adjusting spring 198 is the provision of the following from both formulae (33) and (34):

$$k_2 = \frac{(PCf - PCe)(A_4 - A_3) - W_G(Bf - Be)}{\Delta x} \qquad 35$$

$\beta f$, $\beta e$, Pc and Pce of various items of the right formula of the formula (35) are the values easily determined from the provision of the proportioning pressure reducing characteristic line corresponding to the ideal brake pressure curve of the objective vehicle, and $W_G$, $A_4$, $A_3$ and $\Delta x$ are the value easily determined from the structure of the design of the present invention.

In order that the brake pressure arrives at Pce when the loading condition is in no load condition, the fluid passage between the deceleration sensing mechanism 50 and the control apparatus 150 is closed by the deceleration generated and the differential piston 175 is balanced at the original position, the condition of the sensor control spring 199 is obtained by the formulae (6) and (7), and the condition of the adjusting spring 198 is obtained from the from the formula (31).

In order that the differential piston 175 is displaced by $\Delta x$ when the brake pressure arrives at Pcf at the brake operation when the loading condition is in full loading state to become balanced state, and that the fluid passage between the deceleration sensing mechanism 50 and the control apparatus 150 is closed by the deceleration generated thereat, the conditions of the sensor control spring 199 is obtained from the formulae (32) and (35).

From the foregoing description, it is understood that the deceleration sensing mechanism 50 of the present invention is operated by the set deceleration corresponding to the loading condition so that the inlet fluid passage to the control apparatus 50 is closed and a predetermined pressure is sealed in the control apparatus 150.

When the brake pressure arrive at Pcf by the brake operation of the full loading state, the actuating force of the plunger valve 109 by the above various conditions is: in the direction opposite to the arrow 127:

$$Pcf \cdot A_2 + S_3 - k_3 \cdot dy$$

in the direction of the arrow 126:

$$Pcf \cdot A_2$$

the fluid passage from the inlet port 21 to the outlet port 26 by the composite force $S_3 - k_3 \cdot dy$ is held open, but when the pressure introduced into the inlet port 21 is increased further to arrive at PSmf and it satisfies the formula (24), the force acting onto the plunger valve 109 is:

in the direction opposite to the arrow 127:

$$(Pcf + S_3/A_2)A_2 - k_3 \cdot dy$$

in the direction of the arrow 126:

$$PSmf \cdot A_2 \rightarrow (Pcf + S_3/A_2)A_2 \qquad 50$$

it is displaced by dy in the direction of the arrow 126 to hold a balance at the position where the rounded portion 112 is contacted with the valve seat 139, and the fluid passage from the inlet port 21 to the outlet port 26 is closed.

Since the effective sealing area formed when the rounded portion 112 is contacted with the valve seat 139 is $A_1$ as already described, the actuating force to the plunger valve 109 at the point B in FIG. 8 is:

in the direction opposite to the arrow 127:

$$(Pcf + S_3/A_2)A_2 + PSmf(A_1 - A_2)$$

in the direction of the arrow 126: PSrf
As both are in balanced condition, $$PSrf \cdot A_1 = PSmf(A_1 - A_2) + Pcf \cdot A_2 + S_3 \qquad 36$$

$$PSrf = PSmf \frac{A_1 - A_2}{A_1} + \frac{PCf \cdot A_2 + S_3}{A_1} \qquad 36'$$

wherein

When the pressure introduced into the inlet port 21 is further increased, $\Delta Pm$ from the closing condition of the above fluid passage, $$PSrf \cdot A_1 < (PSmf + \Delta pm)(A_1 - A_2) + Pcf \cdot A_2 + S_3$$

the balanced condition is broken so that the rounded portion 112 is separated from the valve seat 139, the increased pressure of the inlet port 21 starts to flow at the outlet port 26 side. When the flowing out to the outlet port 26 side arrive at and the fluid passage is again closed to be returned to the balanced state, the following formula is consisted.

$$(PSrf + \Delta Pr)A_1 = (PSmf + \Delta Prm)(A_1 - A_2) + Pcf \cdot A_2 + S_3 \qquad 37$$

from the formulae (37) and (36), $$\Delta Pr = \Delta Pm \frac{A_1 - A_2}{A_1} \qquad 38$$

That is, the pressure introduced to the inlet port 21 side exceeds PSmf so that the increment $\Delta Pm$, in turn, increased slightly releases the fluid passage by the increment, it shows that every time when the pressure reduced by a constant rate determined by $A_1$ and $A_2$ is discharged to the outlet port 26, the fluid passage is closed, the gradient of the straight line BB' with respect to the pressure axis of the front wheel brake axis, that is its reduction ratio is $(A_1 - A_2)/A_1$, this is the same value as the above gradient of the no load proportioning pressure reducing line AA' as clear from the formula (11). That is, the formulae (11) and (38) indicate that the proportioning pressure reducing line corresponding to the loading conditions have the same reduction ratio, and it proves to satisfy the main scope of the present invention. The straight line BB' may be represented by the following general formula by substituting the front and rear wheel brake pressure Pmf, Prf corresponding to any one point on the full load proportional reducing pressure line to the formula (37').

$$PRf = PMf \frac{A_1 - A_2}{A_1} + \frac{PCf \cdot A_2 + S_3}{A_1} \qquad 39$$

The formula (39) indicates that the proportioning pressure reducing function is performed by the same reduction ratio similar to the no loading state at full loading state by the present invention together with the formula (12), and a desired proportioning pressure reducing characteristic is obtained by determining the constant $A_1$, $A_2$, $S_3$ and Pc.

Further, since the formula Prf=Pmf is consisted at the starting point B of the operation of the proportioning pressure reducing, that is, the crossing point of the full load proportioning pressure reducing line therewith, the relation at the point B of the formula (39) becomes as follows:

$$Pmf = Pcf + S_3/A_2 \qquad 40$$

The formulae (39) and (40) indicate that the full load proportioning pressure reducing function by the present invention starts at the point where the hydraulic pressure introduced to the inlet opening 21 is $Pcf+S_3/A_2$ and its proportioning pressure reducing ratio is $(A_1 - A_2)/A_1$, and also indicate that the starting point of the operation of full load proportioning pressure reducing is the function of the sealing pressure $Pf$ in the control apparatus 150 acting onto the end surface of the lower stem 121.

From the above description, it is understood that the function approximately adapted in the actual region is performed with the proportioning pressure reducing characteristic having the same proportioning pressure reducing ratio $(A_1 - A_2)/A_1$ as already described value with respect to the ideal brake pressure curve corresponding to the state at any loading state from no loading to full loading state of the loading condition.

The sixth feature of the apparatus of the present invention is the provision of the means for preventing the pressure sealed in the control apparatus 150 from becoming high level by closing the check valve 69 in comparison with the pressure of the inlet port 21 side.

It is preferred that when the pressure of the inlet port 21 side arrives at $Pci$ in response to the loading condition as already described whereby the fluid passage is closed by the check valve 69 in sensing with the deceleration $\alpha i$ generated thereby, the pressure sealed in the control apparatus 150 and the pressure of the inlet port 21 side are equivalent. However, for example, with the resilient deformation of the check valve 69 formed by high polymer resilient material and the moving amount $dx$ of the check valve plunger 60, the voluminal change in the control apparatus 150 is induced so that the pressure in the control apparatus 150 is increased. In order to prevent this problem of the region, when the sealing flange of the first cup seal 106 provided at the proportioning pressure reducing valve apparatus 80 is in high level of the pressure of the inlet port 21 side in comparison with the pressure in the second blind bore 101, the pressure of the inlet port 21 side is prevented from entering the second blind bore 101 passing therethrough, but when the pressure in the second blind bore 101 is in high level in comparison with the hydraulic pressure of the inlet port 21 side, one way sealing function is held so that the pressure in the second blind bore 101 passes therethrough to flow out at the inlet port 21 side.

It is well known that the starting point of the operation of the proportioning pressure reducing of the proportioning pressure reducing valve normally known is controlled by the operating force of the spring provided thereat.

Recently, there is sometimes seen the means for inserting the deceleration sensing load responsive proportioning valve the normal brake pressure circuit formed at the closed circuit to change the operating force to change the mounting length of the spring contained in the sealing container floating thereby by introducing part of the brake operating pressure by the means for sensing the deceleration provided in advance based on the principle to be the function of the loading weight of the vehicle by the deceleration obtained by the brake operating pressure. Normally, the difference of the pressure of the starting point of the operation of pressure reducing of the no load ideal brake pressure curve and the pressure of the starting point of the operation of the proportioning pressure reducing of the full load ideal brake pressure curve becomes increased, as the vehicle having larger allowable loading amount at the proportioning pressure reducing line approximately adapted normally for the former and latter curves. Therefore, the displacing amount of the floating sealing container for adapting for the pressure of starting point of the operation of the proportioning pressure reducing of both is increased, as the loading amount is increased. This means for reducing the displacing amount of the floating sealing container is obtained by enlarging the spring constant, but this method has limit since it introduces the increase of the hysteresis produced at the step of the brake releasing operation as already described.

The displacement of the floating sealing container in the circuit of brake pressure circuit formed in the closed circuit introduce the increase of the circuit volume, and accordingly introduces the deterioration of the pedal feeling due to the increase of the required fluid amount. As described as the second feature of the present invention already, since the starting point of operation of the proportioning pressure reducing of the proportioning valve is controlled not by the operating force of the spring, but by part of the brake pressure obtained by means for sensing the deceleration provided in advance, the cause of the circuit volume caused by the control of the part as above is removed.

The seventh feature of the present invention is the possibility of controlling all the region of the loading condition with the consumed fluid amount extremely small based on the reason as will be described hereinafter. The base for restraining the consumed fluid amount to small value of the present invention is using a mechanism for introducing the volumetric increase of the means for controlling small variation region as the relation of the set deceleration at no load condition and the set deceleration speed at full load condition without using the mechanism for introducing the volumetric increase of means for controlling the variation region largely as the relation of the pressure of starting point of operation of proportioning pressure reducing of no load condition and the pressure of starting point of operation of proportioning pressure reducing at full load condition.

It is clearly understood from the foregoing description that the structure and operational function of the load responsive proportioning pressure reducing valve shown as the reference example is sufficient in content for performing the object and features of the present invention. Various application, variation and alternation may be possible within the scope of the present invention to enhance the value of the present invention.

What is claimed is:

1. A load responsive pressure modulating valve device for use in a brake system of a wheeled vehicle, having front and rear wheel braking means, said device provided with means for modulating a hydraulic brake pressure supplied to the front and rear wheel braking means so as to distribute the hydraulic brake pressure corresponding approximately to a weight transfer in the vehicle caused by the braking operation to said front and rear wheel braking means, whereby the hydraulic brake pressure supplied to said rear wheel braking means is reduced in comparison with that supplied to said front wheel braking means, comprising: means for modulating said hydraulic brake pressure so that a starting pressure for directing the pressure modulating operation thereto is controlled by a partial pressure of said hydraulic brake pressure; means for detecting the deceleration of the vehicle disposed in a branch circuit of the hydraulic brake pressure circuit including either of said front and rear wheel braking means, said detecting means being movable in response to a predetermined deceleration of the vehicle corresponding to the hydraulic brake pressure for a light load condition; means disposed in a branch circuit of the hydraulic brake pressure circuit including either of said front and rear wheel braking means for separating said partial pressure of said hydraulic brake pressure in response to the displacement of said deceleration detecting means in order to apply said partial pressure to the control of said starting pressure; and means disposed in a branch circuit of the hydraulic brake pressure circuit including either of said front and rear wheel braking means for sensing and controlling the hydraulic brake pressure which increases in proportion to said predetermined deceleration in response to an increase of a value of the hydraulic brake pressure required for generating said predetermined deceleration of the vehicle by utilizing characteristics that said pressure value for generating said predetermined deceleration speed increases in proportion to an increase of a load of the vehicle, whereby the hydraulic brake pressure matching the weight transfer caused by the braking operation under any load condition of the vehicle is distributed to said front and rear wheel braking means, respectively.

2. The device as set forth in claim 1, further comprising a separating chamber for separating and receiving a part of the hydraulic brake pressure controlling said starting pressure for directing the pressure modulating operation of said hydraulic brake pressure modulating means, said hydraulic brake pressure sensing and controlling means be slidingly and resiliently disposed in said separating chamber where said hydraulic brake pressure sensing and controlling means and said separating means are engaged with each other through a resilient member, wherein when the hydraulic brake pressure introduced into said separating chamber increases, a part of power of said sensing and controlling means urged by thus increased hydraulic brake pressure in said separating chamber is transmitted to said separating means through said resilient means, whereby said predetermined deceleration to be detected by said deceleration detecting means is made to vary.

3. The device as set forth in claim 2, further comprising disposing said separating means between a chamber housing of said deceleration speed detecting means and said separating chamber means, wherein a fluid passage having a throttle effect and communicating said both of said chambers with each other only when said separating means be in its opening portion, whereby said separating means is started while being combined with the starting effort of said deceleration detecting means to said separating means.

4. The device as set forth in claim 3, further comprising a fluid-tight air chamber segregated from said hydraulic brake pressure sensing and controlling means wherein, when the pressure in said separating chamber is made to increase by that the volume of said separating chamber is reduced by the action of said hydraulic brake pressure modulating means under the condition that said separating chamber is separated from said hydraulic brake prresure circuit by said separating means, said air chamber is compressed by the responsibility of said hydraulic brake pressure sensing and controlling means owing to said increased pressure in said separating chamber, whereby the rise of pressure in said separating chamber is suppressed in a minimum value.

5. The device as set forth in claim 4, further comprising a check valve disposed between said brake circuit and the separating chamber for exhausting fluid excessively pressurized within said separating chamber into said hydraulic brake pressure circuit only when the pressure in the separating chamber being too high in comparison with that in said brake circuit.

6. The device as set forth in claim 5, wherein the deceleration detecting means is spherically formed.

7. The device as set forth in claim 6, wherein the ratio of the effective area of said fluid passage communicating the front part and the rear part chambers of said chamber housing each deceleration detecting means with each other separated by said deceleration detecting means in the direction of the operation axis thereof with respect to the perpendicular cross section area of said operation axis is held over 28%.

8. A load responsive pressure modulating valve for use in an hydraulic braking system of a wheeled vehicle having front and rear hydraulically actuated braking means comprising:
   a. a housing having a bore connected to a master cylinder and the rear braking means so as to transmit hydraulic braking pressure from said master cylinder to said rear wheel brake system.
   b. a plunger slidably mounted in said bore to modulate the hydraulic braking pressure supplied to the rear braking means by reducing the hydraulic braking pressure when a predetermined value of starting pressure is reached,
   c. a chamber in said housing connected to one end of said bore, and
   d. a differential piston having different areas on opposite sides thereof so that equal pressures will cause the piston to move slidably mounted in said chamber to generate a load responsive pressure which is supplied to one end of said plunger to vary the predetermined value of the starting pressure at which the modulating operation begins.

9. A load responsive pressure modulating valve for use in an hydraulic braking system of a wheeled vehicle having front and rear hydraulically actuated braking means comprising:
   a. a housing having a bore connected to a master cylinder and the rear braking means so as to transmit hydraulic braking pressure from said master cylinder to said rear wheel brake system.
   b. a plunger slidably mounted in said bore to modulate the hydraulic braking pressure supplied to the rear braking means by reducing the hydraulic braking pressure when a predetermined value of starting pressure is reached,
   c. a chamber in said housing connected to one end of said bore, and
   d. a check valve located in said chamber which closes when a pressure value therein is less than the pressure value in the master cylinder, and opens when the former is greater than the later, wherein said check valve is a cup seal mounted around said plunger.

10. A load responsive pressure modulating valve as claimed in claim 9, wherein said chamber generating the pressure has the differential piston for increasing the volume of the chamber in proportion to an increase of the pressure valve in the chamber.

\* \* \* \* \*